US012592148B2

(12) United States Patent
Yamaguchi et al.

(10) Patent No.: US 12,592,148 B2
(45) **Date of Patent: *Mar. 31, 2026**

(54) VEHICLE TRAFFIC CONTROL SYSTEM

(71) Applicant: SUBARU CORPORATION, Tokyo (JP)

(72) Inventors: Fumihito Yamaguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 18/716,124

(22) PCT Filed: Oct. 25, 2022

(86) PCT No.: PCT/JP2022/039637

§ 371 (c)(1),
(2) Date: Jun. 3, 2024

(87) PCT Pub. No.: WO2024/089753

PCT Pub. Date: May 2, 2024

(65) Prior Publication Data

US 2025/0037581 A1 Jan. 30, 2025

(51) Int. Cl.
*G08G 1/00* (2006.01)
*G08G 1/0967* (2006.01)
*G08G 1/16* (2006.01)

(52) U.S. Cl.
CPC . *G08G 1/096766* (2013.01); *G08G 1/096708* (2013.01); *G08G 1/164* (2013.01)

(58) Field of Classification Search
CPC ....... G08G 1/096766; G08G 1/096708; G08G 1/164; G08G 1/0112; G08G 1/096725;
(Continued)

(56) References Cited

U.S. PATENT DOCUMENTS 6,223,125 B1 4/2001 Hall
2004/0193347 A1 9/2004 Satoshi et al.
(Continued)

FOREIGN PATENT DOCUMENTS

JP 2002-541536 A 12/2002
JP 2005-056372 A 3/2005
(Continued)

OTHER PUBLICATIONS

International Search Report received in PCT Application No. PCT/JP2022/039637, dated Jan. 17, 2023.
(Continued)

*Primary Examiner* — Shardul D Patel
(74) *Attorney, Agent, or Firm* — Rimon P.C.

(57) ABSTRACT

In a server apparatus of a traffic control system, a preprocessor records a position of a vehicle in a database. A control information generator periodically generates individual control information regarding vehicles by using information in the database, and transmits the individual control information to each vehicle. Each vehicle controls travel of the subject vehicle by using the latest individual control information received from the server apparatus. In the server apparatus, an emergency processor is implemented when received travel information includes information that hinders travel of another vehicle, and generates and transmits information corresponding to the information that hinders the travel of the other vehicle, as the individual control information regarding each of the vehicles.

6 Claims, 12 Drawing Sheets

(58) Field of Classification Search
CPC ............... G08G 1/096741; G08G 1/09; G08G 1/096775; G08G 1/00
USPC ........................................................... 701/117
See application file for complete search history.

(56) References Cited

U.S. PATENT DOCUMENTS

| | | | | |
|---|---|---|---|---|
| 2020/0168094 | A1 | 5/2020 | Manabu et al. | |
| 2021/0201677 | A1 | 7/2021 | Oyama et al. | |
| 2021/0201684 | A1* | 7/2021 | Oyama | G08G 1/09675 |
| 2022/0277651 | A1 | 9/2022 | Yuta et al. | |

FOREIGN PATENT DOCUMENTS

| | | | |
|---|---|---|---|
| JP | 2019-128697 | A | 8/2019 |
| JP | 2021-111332 | A | 8/2021 |
| JP | 2021-111340 | A | 8/2021 |
| JP | 2022-009988 | A | 1/2022 |
| WO | 2021/038741 | A1 | 3/2021 |

OTHER PUBLICATIONS

Notice of Reasons for Refusal received in Japanese Patent Application No. 2024-517154, dated Oct. 29, 2024.

* cited by examiner

[ FIG. 1 ]
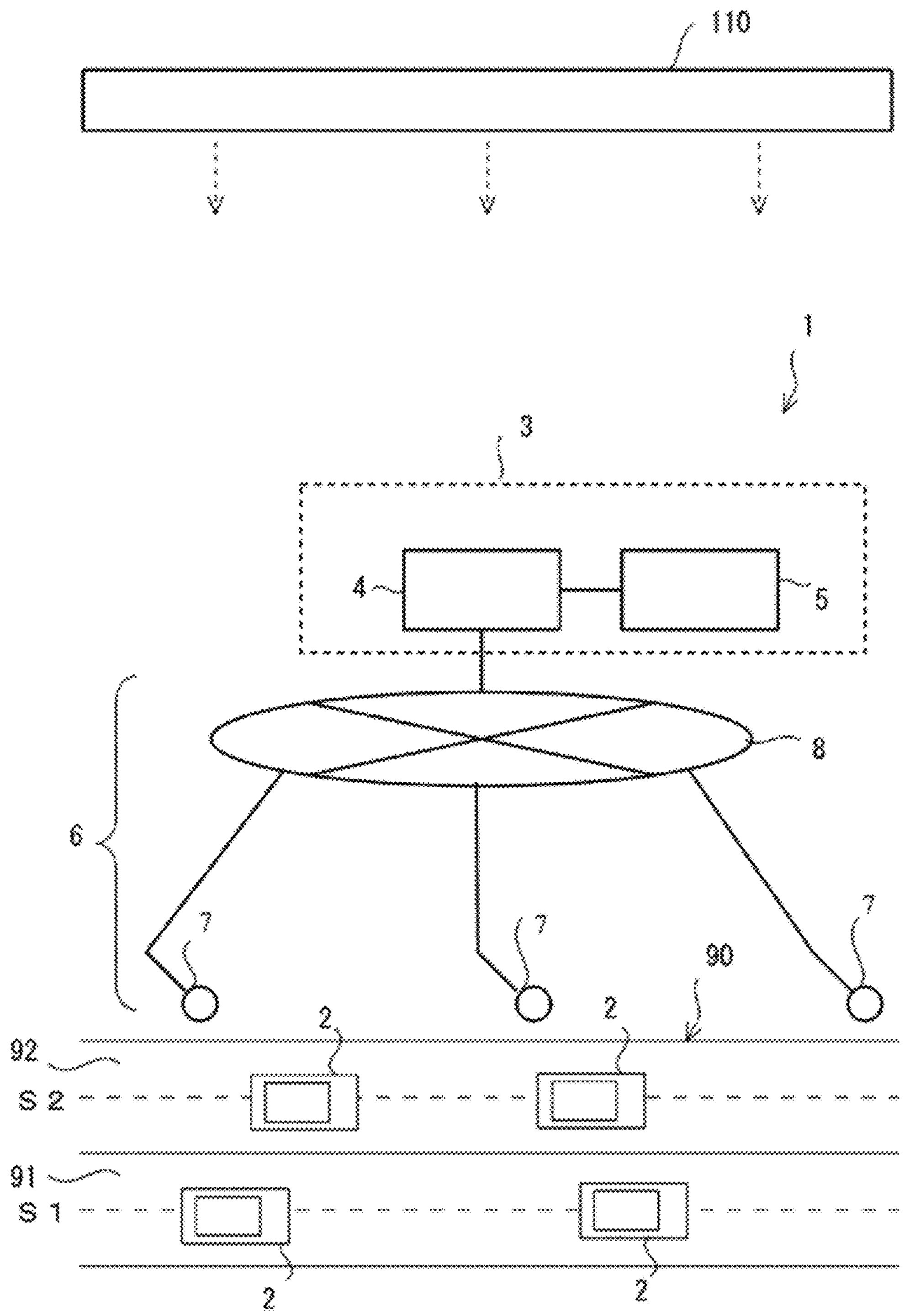

【FIG. 2】
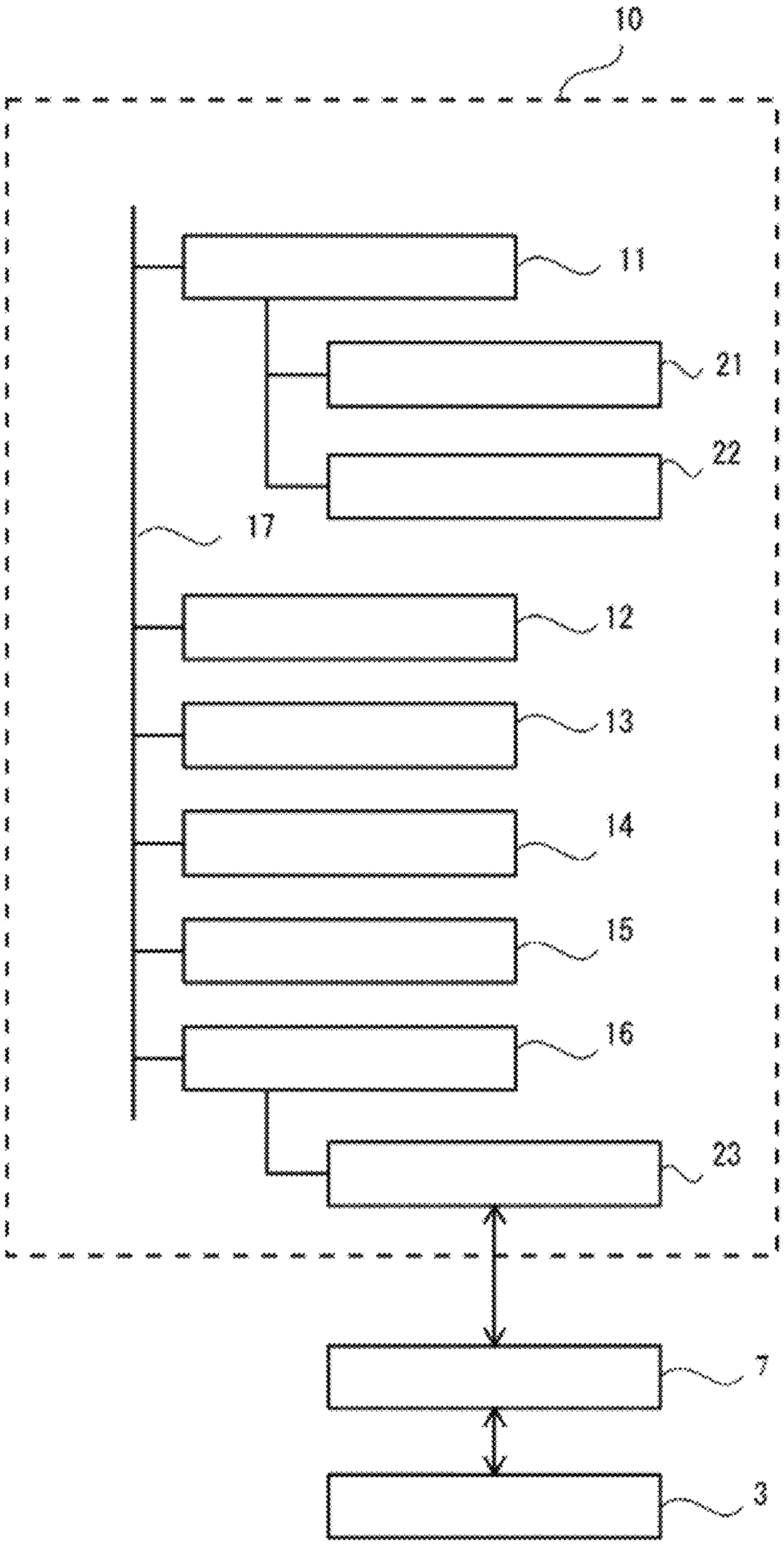

[ FIG. 3 ]
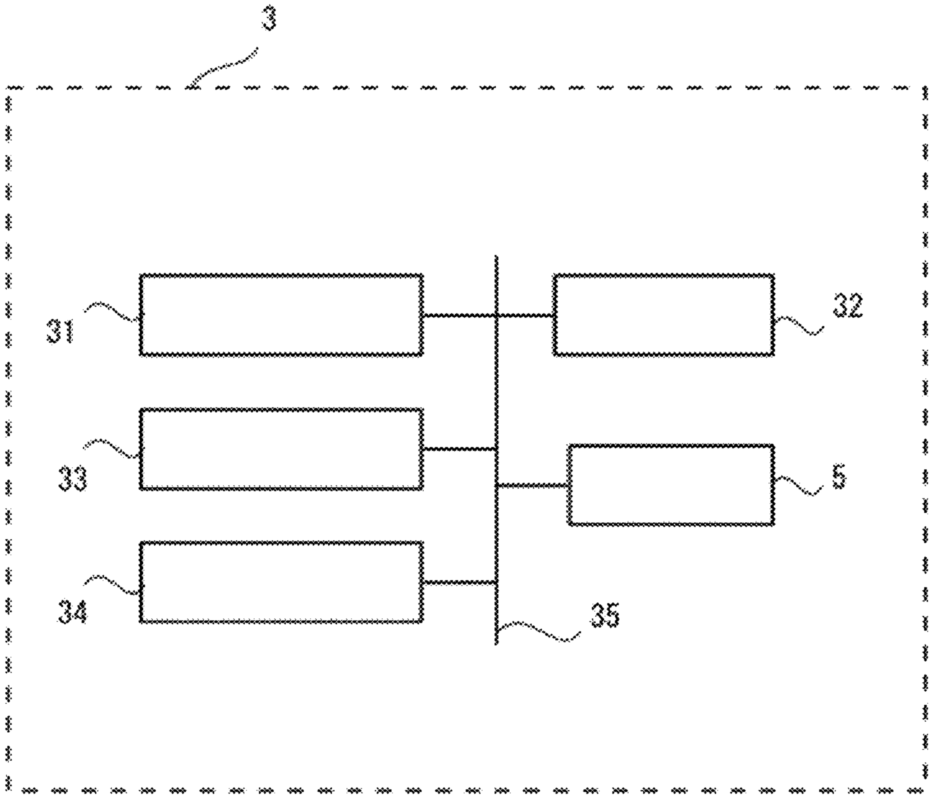

[ FIG. 4 ]
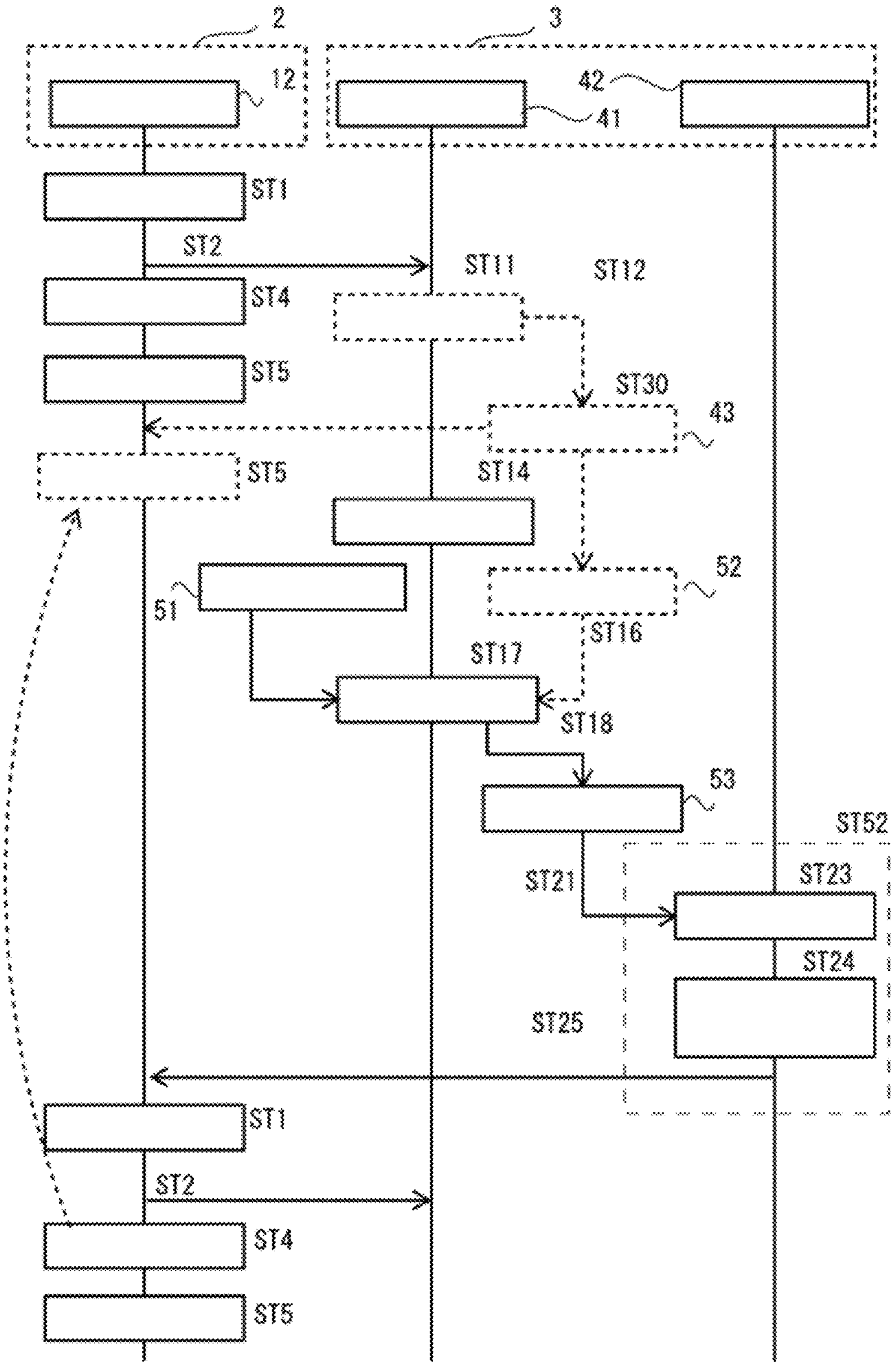

[ FIG. 5 ]
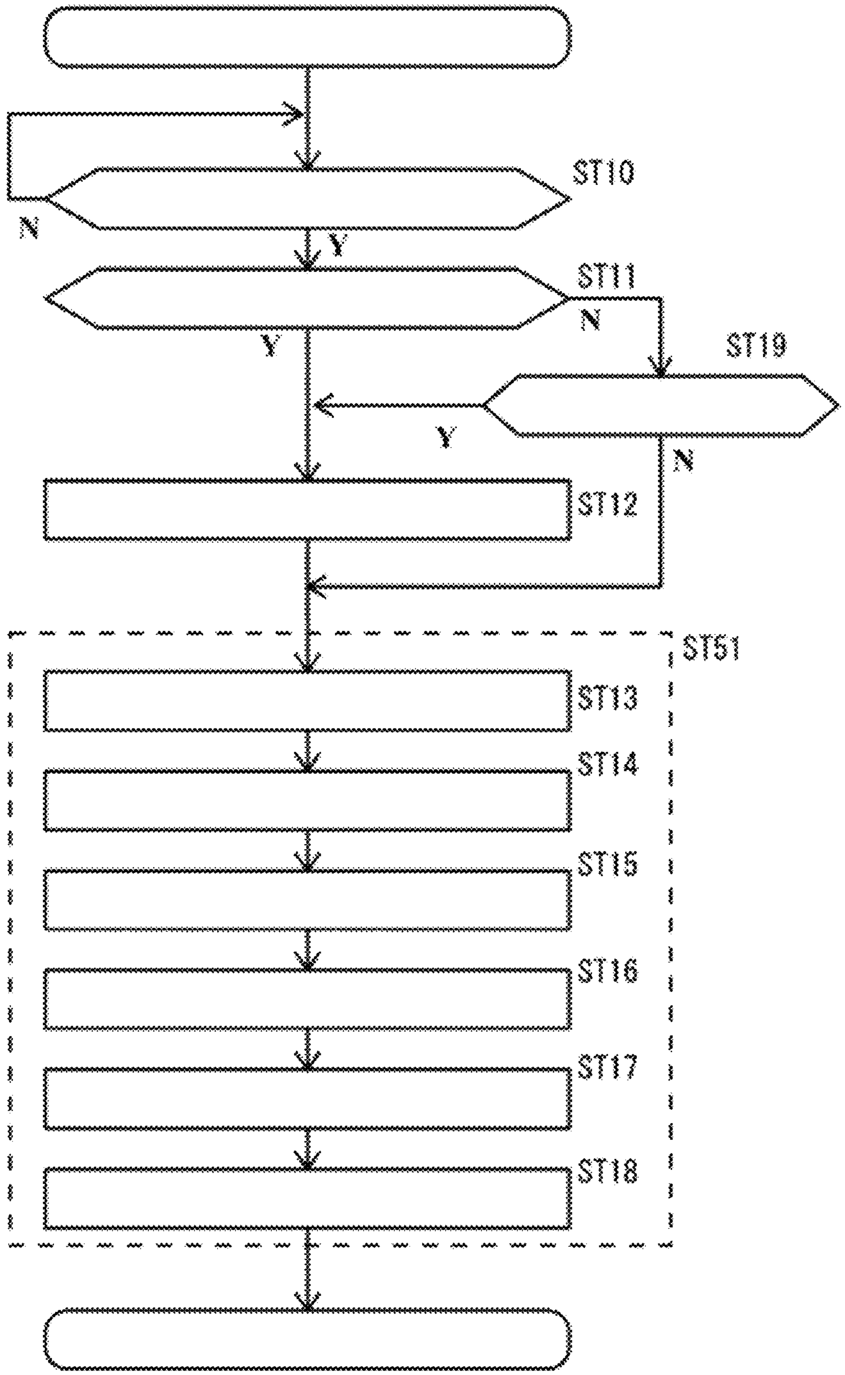

[ FIG. 6 ]
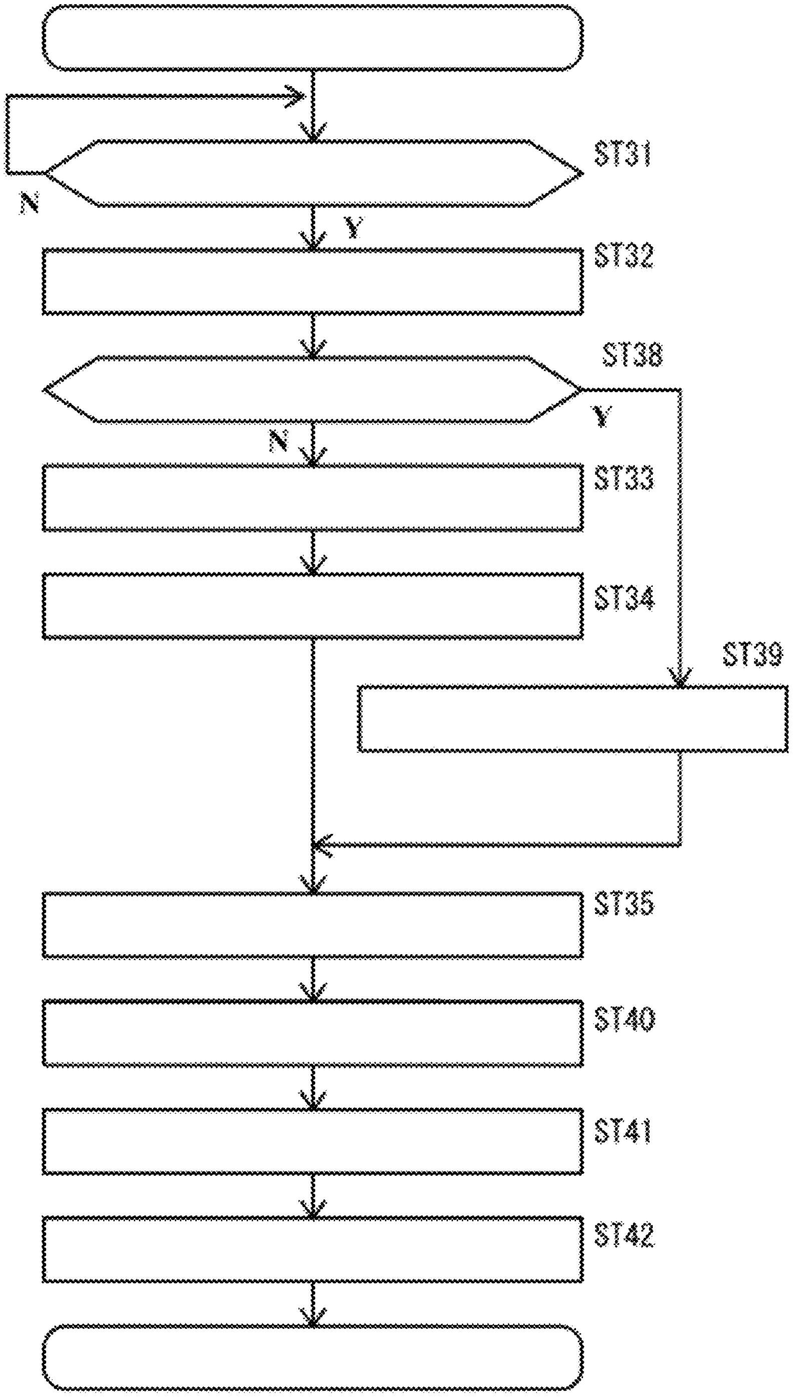

[ FIG. 7 ]
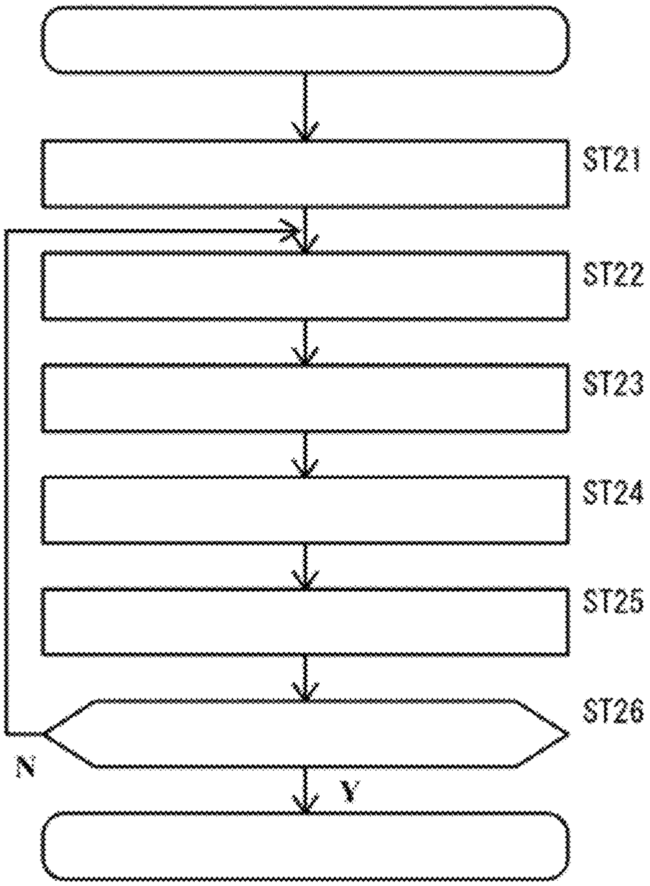

[ FIG. 8 ]
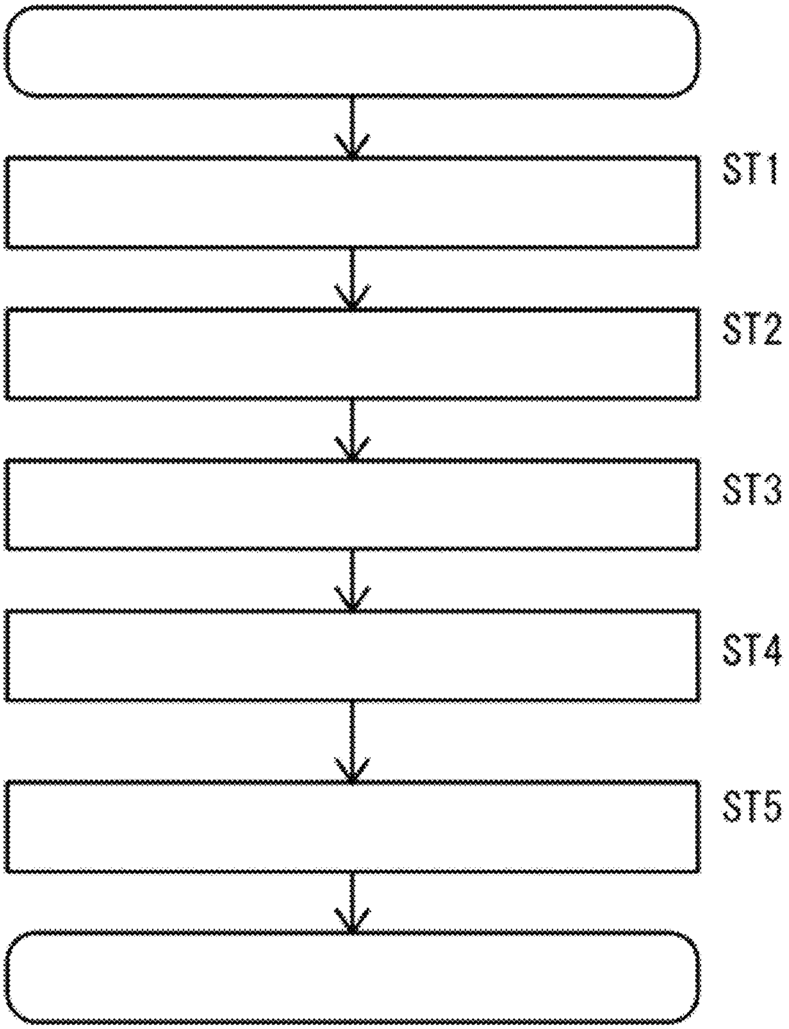

[ FIG. 9 ]
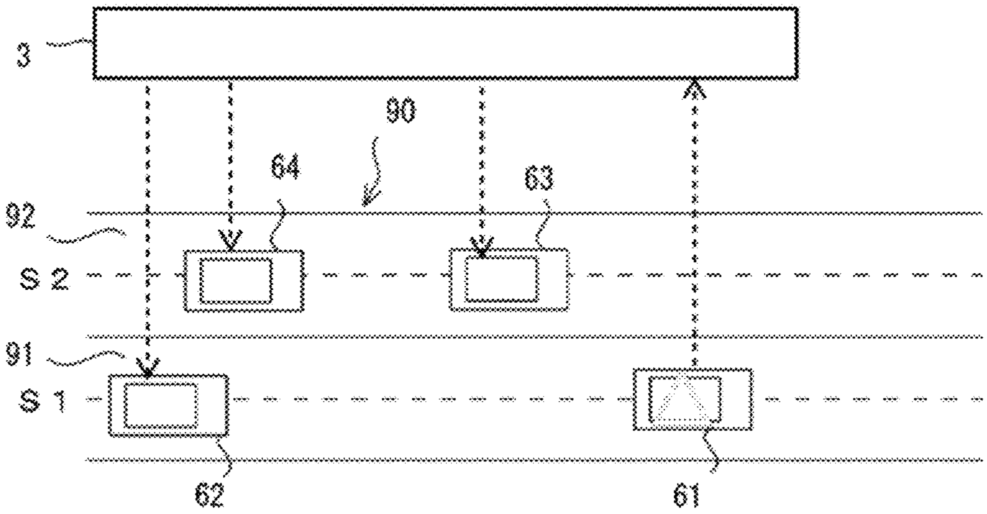
[ FIG. 10 ]
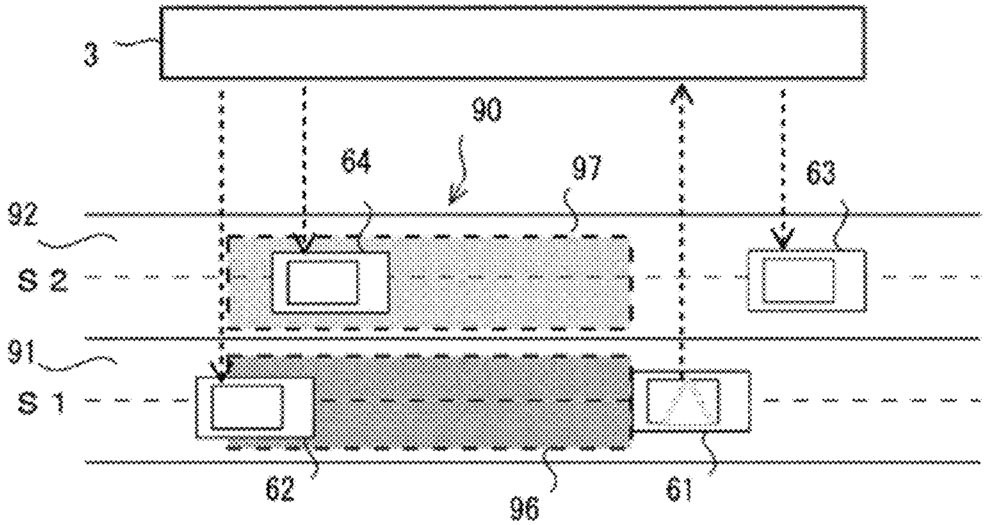

[ FIG. 11 ]
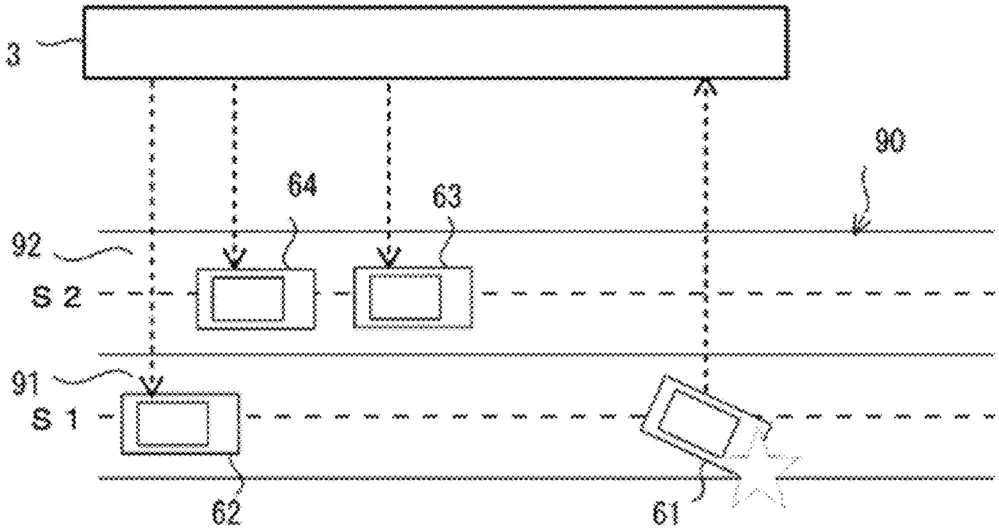
[ FIG. 12 ]
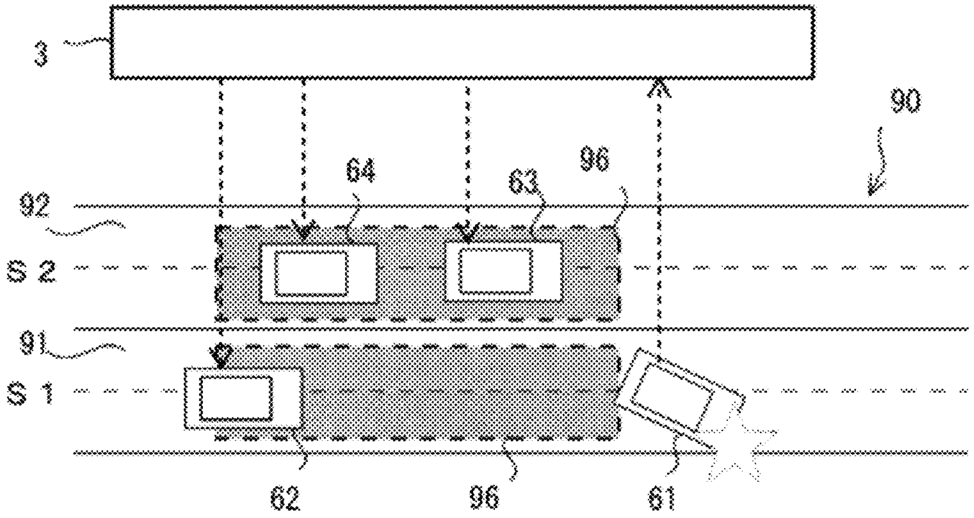

[ FIG. 13 ]
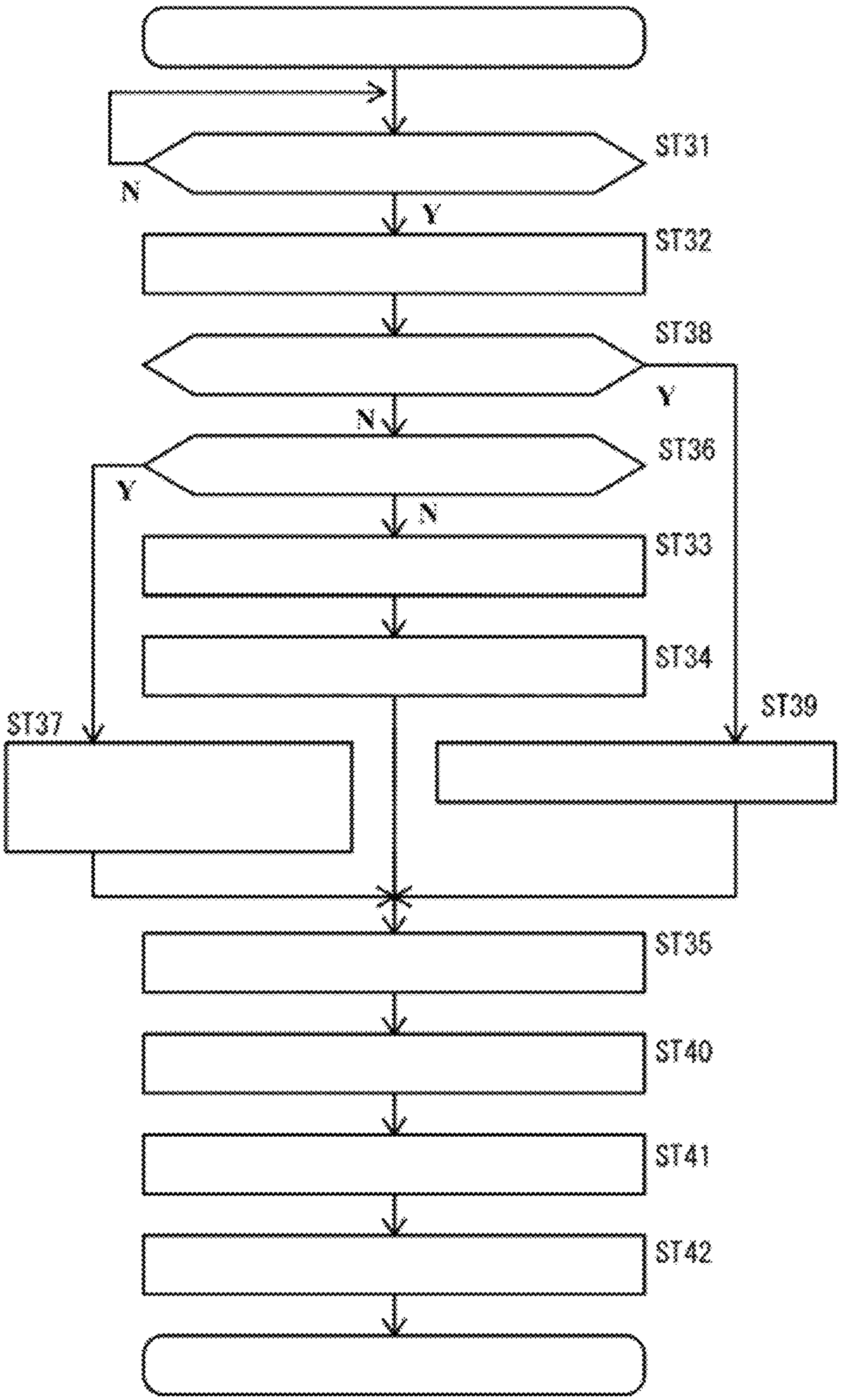

[ FIG. 14 ]
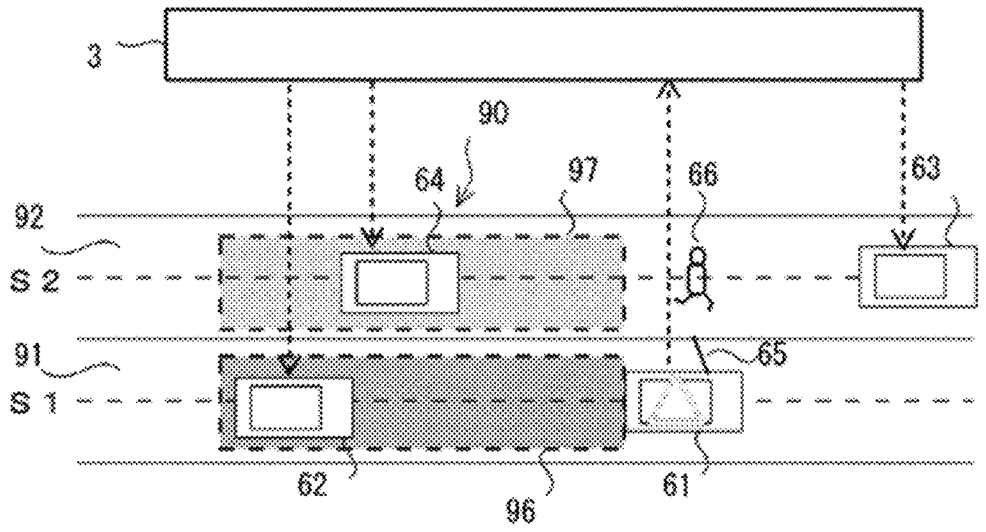
[ FIG. 15 ]
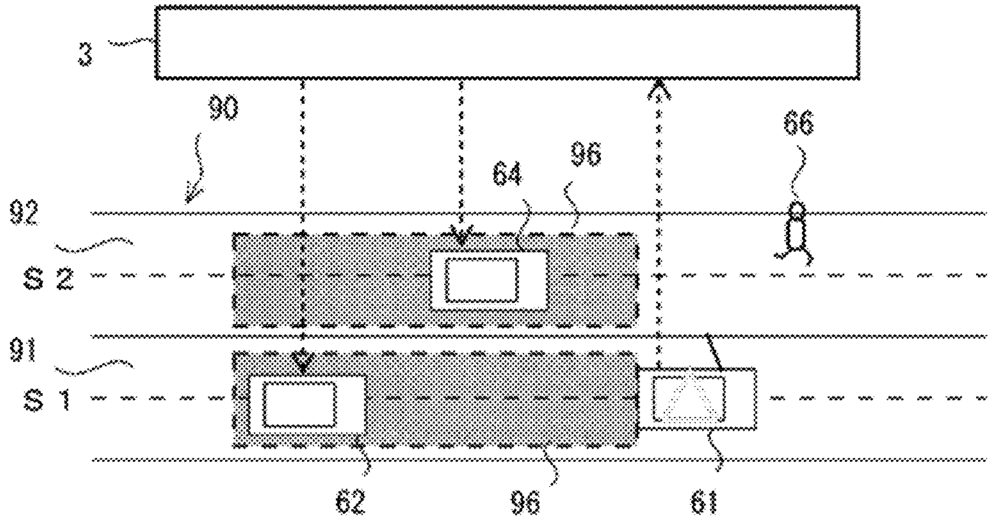

VEHICLE TRAFFIC CONTROL SYSTEM

Cross-Reference to Related Applications

This application is the U.S. National Phase under 35 U.S.C. § 371 of International Application No. PCT/JP2022/039637, filed on Oct. 25, 2022.

TECHNICAL FIELD

The invention relates to a vehicle traffic control system.

BACKGROUND ART

For vehicles including automobiles, an automated driving technique has been developed that detects a travel state of a vehicle based on, for example, a captured image by a vehicle outside camera provided in the subject vehicle, and controls travel of the subject vehicle by using the detection information.

However, when controlling the travel of the subject vehicle based on detection information of a subject-vehicle sensor such as the vehicle outside camera provided in the subject vehicle, the travel control is basically a control based on information in a visual field of the subject vehicle.

Hence, a server apparatus may collect travel information regarding multiple vehicles, generate an individual control value for each vehicle based on, for example, positions of the multiple vehicles, and transmit the individual control values to the multiple vehicles.

In addition, Patent Literature 1 proposes a lane change route instructing apparatus that is provided in a vehicle and generates and delivers an individual travel route for each vehicle regarding surrounding multiple vehicles.

When using the server apparatus or the lane change route instructing apparatus, it is possible for each vehicle to control the travel of the subject vehicle, based on the control value or the travel route obtained based on information unobtainable in a visual field of the subject vehicle. In addition, it is expected that each vehicle and another vehicle around each vehicle basically achieve smooth and stable travel with less sudden changes without interfering with each other.

CITATION LIST

Patent Literature

Patent Literature 1: International Publication No. WO 2021/038741

Patent Literature 2: Japanese Unexamined Patent Application Publication No. 2022-9988

SUMMARY OF INVENTION

Problem to be Solved by the Invention

However, when one server apparatus or one lane change route instructing apparatus as in Patent Literature 1 generates an individual travel route or an individual control value for all vehicles under the control of the server apparatus or the lane change route instructing apparatus, it is predicted that excessive processing loads are easily placed on the apparatuses. Both of the apparatuses seem to be difficult to employ for a wider control range.

In particular, when the lane change route instructing apparatus provided in one vehicle as in Patent Literature 1 intends to generate the individual travel route for not only the subject vehicle but also surrounding multiple other vehicles, the lane change route instructing apparatus is to have a processing capability unnecessarily high for only the vehicle including the lane change route instructing apparatus. Providing each vehicle with such a high processing capability exerts direct influence on a selling price of each vehicle.

For an automated driving control of a vehicle, Patent Literature 2 discloses transmitting accident information from, for example, a server apparatus to the vehicle, and detecting an accident as an event.

In addition, for example, in an environment where vehicles travel, a vehicle can malfunction to stop on a road, or an occupant can alight from a stopped vehicle on a road.

Even in a travel environment in these situations that hinder travel of vehicles, a travel control of a vehicle is to immediately cope with the situation.

As described above, in a travel control of a vehicle, it is desirable to achieve automated driving of the vehicle, to reduce processing loads on a vehicle and a server apparatus used together with the vehicle, and to make it possible to cope with immediacy with a situation that binders travel of vehicles if any.

Means for Solving the Problem

An aspect of the invention provides a vehicle traffic control system including vehicles and a server apparatus. The vehicles each includes a travel controller configured to generate a control value to control travel of a corresponding one of the vehicles as a subject vehicle. The server apparatus is configured to generate individual control information regarding each of the vehicles based on travel information regarding the vehicles, and transmits the individual control information to the vehicles. The travel controller of each of the vehicles is configured to, when receiving the individual control information addressed to the subject vehicle from the server apparatus, generate the control value for a travel control of the subject vehicle by using the received latest individual control information addressed to the subject vehicle. The server apparatus includes a server communication device, a database, a pre-processor, a control information generator, and an emergency processor. The server communication device is configured to receive the travel information from each of the vehicles. The database is configured to accumulate and hold the travel information regarding each of the vehicles. The pre-processor is configured to, when the server communication device receives the travel information, record information regarding at least a travel position of a vehicle among the vehicles related to the travel information. The control information generator is configured to periodically generate the individual control information regarding each of the vehicles by using the information held in the database. The emergency processor is configured to be implemented when the travel information received by the server communication device includes information that hinders travel of another vehicle. The pre-processor is configured to cause an interruption when the travel information received by the server communication device includes the information that hinders the travel of the another vehicle. The emergency processor is configured to, upon being implemented when the travel information received by the server communication device includes the information that hinders the travel of the another vehicle, be implemented earlier than the control information generator that periodically generates the individual control information, by the interruption being caused by the pre-processor, and generate and transmit information corresponding to the information that hinders the travel of the another vehicle, as the individual control information regarding each of the vehicles, by using the information held in the database.

Effects of the Invention

The invention uses the server apparatus to control the travel of the multiple vehicles. Each of the multiple vehicles includes the travel controller that generates the control value to control the travel of the vehicle as the subject vehicle.

In addition, the server apparatus generates the individual control information regarding each of the multiple vehicles based on the travel information regarding the multiple vehicles, and transmits the individual control information to the multiple vehicles. When the travel controller of each of the multiple vehicles receives the individual control information addressed to the subject vehicle from the server apparatus, the travel controller of each of the multiple vehicles generates the control value for the travel control of the subject vehicle by using the received latest individual control information addressed to the subject vehicle. In this manner, by utilizing the travel controller provided in the multiple vehicles, it is possible for the server apparatus to perform a traffic control on the travel of the multiple vehicles, without generating an individual control value different between vehicles regarding the multiple vehicles. Even if a control range of the server apparatus widens or the number of vehicles to be controlled increases, it is possible for the server apparatus to perform the traffic control on the travel of the multiple vehicles with a lower processing load, as compared with a case of generating the individual control value for each vehicle.

Moreover, the server apparatus in the invention includes the database that accumulates and holds the travel information regarding each of the multiple vehicles. The pre-processor of the server apparatus records, when the receiving device receives the travel information, the information regarding at least the travel position of the vehicle related to the travel information, in the database. In addition, the control information generator of the server apparatus periodically generates the individual control information regarding each of the multiple vehicles by using the information held in the database. In contrast, the emergency processor of the server apparatus is implemented when the travel information received by the receiving device includes the information that hinders the travel of the other vehicle. Accordingly, when no situation that hinders travel of vehicles has occurred, the pre-processor and the control information generator are implemented in the server apparatus. Periodic processing in a normal operation of the server apparatus increases or decreases in accordance with the number of vehicles to be controlled. A processing capability of the server apparatus is easily determinable based on the number of vehicles assumed in its control range. In addition, it is expected to be possible for the server apparatus to stably keep generating, without failure, the individual control information for each of the multiple vehicles.

Upon occurrence of the situation that hinders the travel of the vehicles, the server apparatus in the invention implements the emergency processor based on the travel information received by the server communication device. The emergency processor generates and transmits the information corresponding to the information that hinders the travel of the other vehicle, as the individual control information regarding each of the multiple vehicles, by using the information held in the database. The individual control information generated by the emergency processor is transmitted to each vehicle, as with the individual control information periodically generated by the control information generator. Thus, it is possible for the travel controller of each vehicle to receive the individual control information generated by the emergency processor implemented upon occurrence of the situation that hinders the travel of the vehicles, without waiting for reception of the individual control information generated by the control information generator. Moreover, the individual control information corresponds to the information that hinders the travel of the other vehicle. As a result, upon occurrence of a situation that hinders the travel of the subject vehicle, it is possible for the travel controller of each vehicle to immediately receive the individual control information to be used to cope with the situation, and immediately control the travel of the subject vehicle to correspond to the individual control information, without waiting for reception of the individual control information generated by the control information generator.

In addition, even in a case of immediately coping with such a situation that hinders the travel of the vehicles, the server apparatus does not have to generate the individual control value for each vehicle. Processing contents of and the processing load on the server apparatus upon occurrence of the situation that hinders the travel of the vehicles tend not to be excessive as compared with in the normal operation with no situation that hinders the travel of the vehicles.

As described above, the invention makes it possible to achieve a travel control for automated driving of a vehicle, to reduce processing loads on a vehicle and a server apparatus used together with the vehicle, and to make it possible to cope with immediacy with a situation that binders travel of vehicles if any.

BRIEF DESCRIPTION OF DRAWINGS

FIG. 1 is a configuration diagram of a vehicle traffic control system according to a first embodiment of the invention.

FIG. 2 is an explanatory diagram of a control system of an automobile in FIG. 1.

FIG. 3 is a hardware configuration diagram of a server apparatus in FIG. 1.

FIG. 4 is a timing chart of a traffic control on travel of multiple automobiles in the traffic control system in FIG. 1.

FIG. 5 is a flowchart of a pre-processing control by a server CPU in FIG. 2.

FIG. 6 is a flowchart of an emergency processing control by the server CPU in FIG. 2.

FIG. 7 is a flowchart of a control information generation control by the server CPU in FIG. 2.

FIG. 8 is a flowchart of a travel control under the traffic control, by a travel control device of the automobile in FIG. 3.

FIG. 9 is an explanatory diagram of a travel environment in which an automobile traveling on a two-lane road has malfunctioned and stopped on the road.

FIG. 10 is an explanatory diagram of a travel environment in which a passage prohibition region and a passage warning region are set after the stop on the road in FIG. 9.

FIG. 11 is an explanatory diagram of a travel environment in which an automobile traveling on a two-lane road has caused a single accident and stopped on the road.

FIG. 12 is an explanatory diagram of a travel environment in which a passage prohibition region is set for all the lanes of the road after the single accident in FIG. 11.

FIG. 13 is a flowchart of an emergency processing control to be executed by a server CPU in a vehicle traffic control system according to a second embodiment of the invention.

FIG. 14 is an explanatory diagram of a travel environment in which an occupant alights from an automobile that has malfunctioned and stopped on a two-lane road.

FIG. 15 is an explanatory diagram of a travel environment in which a passage warning region is updated to a passage prohibition region after the alighting of the occupant in FIG. 14.

MODES FOR CARRYING OUT THE INVENTION

Some embodiments of the invention are described below based on the drawings.

First Embodiment

FIG. 1 is a configuration diagram of a vehicle traffic control system 1 according to a first embodiment of the invention.

The traffic control system 1 in FIG. 1 includes multiple automobiles 2 and a server apparatus 3. The multiple automobiles 2 travel on a road 90. The server apparatus 3 transmits and receives information to and from the multiple automobiles 2 through a communication system 6.

Here, the automobiles 2 are an example of vehicles. Other examples of the vehicles include trucks, buses, motorcycles, and personal mobilities. In FIG. 1, the multiple automobiles 2 travel on the two-lane road 90 including a first lane 91 and a second lane 92.

The communication system 6 includes multiple base stations 7 and a communication network 8. The multiple base stations 7 are arranged along the road 90. To the communication network 8, the multiple base stations 7 are coupled. The base stations 7 may be, for example, those for commercial 5G or those for an advanced transportation system such as ADAS (Advanced driver-assistance systems). The communication network 8 may include, for example, a carrier communication network that provides the base stations for 5G, or the Internet coupled to the carrier communication network.

The server apparatus 3 includes a server main body 4 and a server DB (server database) 5. The server main body 4 is coupled to the communication network 8 of the communication system 6. The server DB 5 is coupled to the server main body 4. Basically, the server apparatus 3 may be coupled to the Internet of the communication system 6. The server apparatus 3 may be coupled to the carrier communication network. In addition, the server apparatus 3 may include not one server main body 4 but multiple server main bodies 4 that execute a control distributively in cooperation with each other. The multiple server main bodies 4 may be hierarchized, for example. The multiple server main bodies 4 at the lowermost layer in the hierarchy may be distributively coupled to the carrier communication network in accordance with, for example, each region thereof. Such server main bodies 4 may be implemented by, for example, control devices of the base stations for 5G.

The server apparatus 3 in FIG. 1 executes a traffic control on the multiple automobiles 2 in a control range configured by zones of at least three base stations 7 in the drawing.

Furthermore, FIG. 1 illustrates GNSS (Global Navigation Satellite System) satellites. The GNSS satellites broadcast signals including information regarding their positions and the time, to the ground. A GNSS receiver is able to obtain information regarding a position and the time of the GNSS receiver by receiving the signals of the multiple GNSS satellites. The position and the time of each GNSS receiver are usable as probable position and time less likely to have errors with respect to the position and the time of another GNSS receiver.

FIG. 2 is an explanatory diagram of a control system 10 of the automobile 2 in FIG. 1.

The multiple automobiles 2 illustrated in FIG. 1 may include the control system 10 in FIG. 2.

The control system 10 of the automobile 2 in FIG. 2 includes a vehicle network 17 and multiple control devices coupled thereto. The control device may basically include a CPU (Central Processing Unit), a memory, a timer, an input-output unit, and an internal bus to which these are coupled. The input-output unit is coupled to the vehicle network 17. A controller is implemented in the control device by the CPU executing a program held in the memory. FIG. 2 illustrates, as the multiple control devices, a sensor control device 11, a travel control device 12, a driving control device 13, a steering control device 14, a braking control device 15, and a vehicle outside communication control device 16. The control system 10 of the automobile 2 may include other control devices, for example, an operation control device or the like.

The vehicle network 17 may be those for vehicles, e.g., the CAN (Controller Area Network) or the LIN (Local Interconnect Network). The vehicle network 17 may include a commonly used network such as the IEEE (Institute of Electrical and Electronics Engineers) 802.3 or the IEEE 802.11. By using such a vehicle network 17, it is possible for each of the control devices to be supplied with information from, and output information to other control devices through the vehicle network 17.

The sensor control device 11 controls operation of various subject-vehicle sensors provided in the automobile 2. The sensor control device 11 outputs detection information of the various subject-vehicle sensors or processed information to other control devices through the vehicle network 17. In FIG. 2, to the sensor control device 11, a GNSS receiver 21 and a vehicle outside camera 22 are coupled, as examples of the subject-vehicle sensors. In addition, a vehicle speed sensor, a steering sensor, an acceleration sensor, and the like may be coupled to the sensor control device 11.

The GNSS receiver 21 generates information regarding a position and the time of the automobile 2.

The vehicle outside camera 22 captures an image of the surroundings of the automobile 2 traveling on, for example, the road 90. The vehicle outside camera 22 may be a monocular camera, a compound-eye camera, or a 360-degree camera. It is desirable that the vehicle outside camera 22 be able to capture at least a frontward view of the traveling automobile 2. The sensor control device 11 may generate information regarding relative distances and directions of other automobiles around the subject vehicle based on the captured image by the vehicle outside camera 22.

The vehicle speed sensor detects a speed of the automobile 2.

The steering sensor detects a steering wheel angle of an unillustrated steering wheel of the automobile 2.

The acceleration sensor detects an acceleration rate of the automobile 2. By using a sensor that detects acceleration rates in three axial directions as the acceleration sensor, it is possible for the sensor control device 11 to generate information regarding angular acceleration rates in yaw, pitch, and roll directions of the automobile 2.

To the vehicle outside communication control device 16, a communication device 23 is coupled. The communication device 23 is provided in the automobile 2. The communication device 23 establishes a wireless communication path with the base station 7 with which communication is available. The vehicle outside communication control device 16 controls operation of the communication device 23, and transmits and receives information to and from the server apparatus 3 through the communication device 23 and the base station 7. For example, the vehicle outside communication control device 16 outputs information received by the communication device 23 from the server apparatus 3 or the base station 7, to another control device through the vehicle network 17. The vehicle outside communication control device 16 transmits information inputted from another control device through the vehicle network 17, to the server apparatus 3 through the communication device 23 and the base station 7.

The driving control device 13 is coupled to members of a drive system provided in the automobile 2, e.g., an engine, a motor, and a transmission. The engine generates a driving force by using, for example, gasoline or hydrogen as fuel. The motor generates a driving force by electric power. The driving control device 13 controls operation of these members of the drive system based on control values acquired through the vehicle network 17.

The steering control device 14 is coupled to, for example, a steering device provided in the automobile 2. The steering control device 14 controls operation of the steering device based on the control value acquired through the vehicle network 17.

The braking control device 15 is coupled to a brake device provided in the automobile 2. The braking control device IS controls operation of the brake device based on the control value acquired through the vehicle network 17.

The travel control device 12 controls travel of the automobile 2. When causing the automobile 2 to travel by automated driving without an operation by an occupant, the travel control device 12 acquires information regarding a travel state of the subject vehicle and information regarding the surroundings of the subject vehicle from the sensor control device 11, and generates the control value corresponding to the information.

For example, when determining that another moving body is approaching ahead of the subject vehicle based on the latest captured image by the vehicle outside camera 22, the travel control device 12 generates the control value for the braking control device 15, to cause the subject vehicle to decelerate or stop.

When determining, based on the latest captured image by the vehicle outside camera 22, that the stopped subject vehicle is ready to start, the travel control device 12 generates the control value for the driving control device 13, to cause the subject vehicle to accelerate When, based on the latest captured image by the vehicle outside camera 22, the subject vehicle is about to deviate from the lane on which the subject vehicle is traveling, the travel control device 12 generates the control value for the steering control device 14, to change a travel direction of the subject vehicle.

In addition, when the travel control device 12 compares the position of the GNSS receiver 21 with high-precision map data 51 and determines that the subject vehicle has to turn right, turn left, or make a lane change, the travel control device 12 generates the control value for the steering control device 14, to change the travel direction of the subject vehicle.

By such autonomous determination and control based on detection by the subject-vehicle sensors, it is possible for the travel control device 12 to cause the automobile 2 to travel by the automated driving.

FIG. 3 is a hardware configuration diagram of the server apparatus 3 in FIG. 1.

The server apparatus 3 in FIG. 3 includes a server communication device 31, a server GNSS receiver 32, the server DB 5, a server memory 33, a server CPU 34, and an internal bus 35 to which these are coupled.

The server communication device 31 is coupled to the communication network 8 of the communication system 6. The server communication device 31 transmits and receives information to and from the communication device 23 provided in the automobile 2. The server communication device 31 may receive travel information from each of the multiple automobiles 2.

The server GNSS receiver 32 generates information regarding a position and the time of the server apparatus 3. The time generated by the server GNSS receiver 32 may be highly accurately identical with the time generated by the GNSS receiver 21 of each automobile 2.

The server DB 5 accumulates and holds various kinds of data to be used by the server apparatus 3 for the traffic control of the multiple automobiles 2. Examples of such data include the travel information regarding each automobile 2. The server DB 5 may include, for example, the high-precision map data 51, a road regulation DB (road regulation database) 52, a vehicle position behavior DB (vehicle position behavior database) 53, and the like, as described later.

The server memory 33 holds data such as programs to be executed by the server CPU 34.

The server CPU 34 reads and executes the programs held in the server memory 33. Thus, in the server apparatus 3, a controller that controls operation of the server apparatus 3 is implemented. The controller may have, for example, functions including a pre-processor 41, a control information generator 42, and an emergency processor 43, as described later.

Now, when using the server apparatus 3 to control travel of the multiple automobiles 2, there are an idea of controlling the travel of each automobile 2 by a remote control, and an idea of controlling the travel of each automobile 2 by the traffic control.

In the remote control, the server apparatus 3 generates and transmits a control value to be used by each automobile 2 for the control thereof as an individual control value. In this case, it is desired that the server apparatus 3 process the travel state or a travel environment of each of the multiple automobiles 2 by its own processing, and generate the individual control value suitable for the travel of each automobile 2.

In contrast, in the traffic control, the server apparatus 3 generates and transmits individual control information corresponding to the travel state of each automobile 2. Here, the individual control information indicates, for example, a request related to a travel control of the automobile 2 that prevents interference with other automobiles.

Such individual control information may be information indicating a request for, for example, acceleration, speed keeping, deceleration, a stop, a speed range (an upper limit and a lower limit), lane keeping, or a lane change of each automobile 2. The individual control information may, for example, include these pieces of information as values of flags. Unlike the individual control value directly usable by, for example, the driving control device 13 in each automobile 2, the individual control information may be information to be used by the travel control device 12 of each automobile 2 to generate a control value for the travel control thereof.

In the remote control, each automobile 2 receives the individual control value received from the server apparatus 3, and gives the individual control value to, for example, the driving control device 13 of the subject vehicle. The travel of each automobile 2 is thus controlled by the server apparatus 3. It is possible for each automobile 2 to control the travel of the subject vehicle, based on the individual control value obtained based on information, such as a remote travel environment, unobtainable in a visual field of the subject vehicle. It seems that each automobile 2 and another automobile around each automobile 2 achieve smooth and stable travel with less sudden changes without interfering with each other, as compared with a case of controlling the travel based on only the information of the subject-vehicle sensors.

However, in the remote control, a high processing load is placed on the server apparatus 3. The server apparatus 3 that executes the remote control has to, for example, map the information collected from the multiple automobiles 2 on the high-precision map data 51 or the like, determine interference based on the mapped information, generate a course of each automobile 2 for suppression of the interference, and generate the individual control value usable by each automobile 2 based on the course. When using the server apparatus 3 to remotely control the travel of the multiple automobiles 2, the number of the processable automobiles 2 tends to be limited, even if the server CPU 34 with a high processing capability is used. It is not easy to employ the server apparatus 3 for the remote control for a wide control range where a large number of the automobiles 2 are likely to travel.

For this reason, in the present embodiment, the traffic control is employed as the control by the server apparatus 3, instead of the remote control. The server apparatus 3 for the traffic control may, without generating the individual control value for each automobile 2, generate and transmit information generated in a stage prior thereto as the individual control information. The server apparatus 3 for the traffic control may generate, as the individual control information, the information regarding the request related to the travel control of the automobile 2 described above.

However, the server apparatus 3 is limited in its processing capability even if the server apparatus 3 employs the traffic control.

Moreover, even in a case of employing the traffic control, it is desired that the server apparatus 3, upon occurrence of, for example, a situation that binders the travel of the automobiles 2 on the road 90 on which the multiple automobiles 2 travel, generate the information regarding the request related to the travel control of the automobile 2 to cope with the situation.

For example, the automobile 2 can malfunction or be involved in an accident to stop on a road. In addition, the occupant can alight from the automobile 2 stopped on a road. Upon occurrence of such events, even in the traffic control, it is desired that the server apparatus 3 generate and transmit the individual control information for each automobile 2, to allow each automobile 2 to control the travel to cope with the event. In particular, it is desired that the server apparatus 3 transmit corresponding information quickly to prevent a great delay in information transmission to each automobile 2.

As described above, it is desirable to optimize the travel control of the automobile 2, to make it possible to reduce processing loads on the automobile 2 and the server apparatus 3 used together with the automobile 2, and to, when a situation that hinders the travel of the automobiles 2 occurs on the road 90 on which the automobile 2 travels, make it possible to cope with the situation.

FIG. 4 is a timing chart of the traffic control on the travel of the multiple automobiles 2 in the traffic control system 1 in FIG. 1. Note that FIG. 4 illustrates only one automobile 2 in relation to the drawing.

FIG. 4 illustrates the travel control device 12 provided in the automobile 2, and the pre-processor 41, the control information generator 42, and the emergency processor 43 implemented in the server apparatus 3. Time flows from top to bottom.

In addition, FIG. 4 illustrates the high-precision map data 51, the road regulation DB 52, and the vehicle position behavior DB 53, as the server DB 5 of the server apparatus 3. These may be held in the server DB 5 of the server apparatus 3.

Here, processing indicated by solid lines in FIG. 4 is executed for a basic traffic control by the pre-processor 41 and the control information generator 42. In contrast, processing indicated by dashed lines is processing that is executed, only upon occurrence of a situation that hinders the travel of the automobiles 2, to cope with the situation.

Step numbers of respective processes in FIG. 4 correspond to those in FIGS. 5 to 8 described later.

The high-precision map data 51 may be the high-precision map data 51 regarding the road 90 on which the automobile 2 are able to travel, e.g., the road 90. The high-precision map data 51 generally includes, for example, information regarding each lane of the road 90, and detailed information regarding intersections. For example, FIG. 1 illustrates the road 90 including the multiple lanes 91 and 92. As for such a road 90, the high-precision map data 51 may include information regarding a first line segment S1 coupling the middle of the first lane 91, and information regarding a second line segment S2 coupling the middle of the second lane 92. As described above, by using the high-precision map data 51 including detailed information regarding the road 90, it is possible for the server apparatus 3 to identify not only the road on which each automobile 2 is traveling but also the lane on which each automobile 2 is traveling and a position on the lane, regarding, for example, the multiple automobiles 2 traveling on the road 90.

When the server communication device 31 receives new travel information, the pre-processor 41 basically records information regarding at least a travel position of the automobile 2 related to the traveling information, in the vehicle position behavior DB 53.

Thus, the vehicle position behavior DB 53 basically holds positions and behavior of the multiple vehicles traveling in a region controlled by the server apparatus 3. It is desirable that the vehicle position behavior DB 53 hold information regarding, for example, the positions of all the automobiles 2 under the control of the server apparatus 3, including those regarding which no individual control information is to be generated. For example, an intersection camera for the ADAS is able to capture an image of basically all the automobiles 2 passing through an intersection. Based on such information, the vehicle position behavior DB 53 may hold, for example, the positions of all the automobiles 2 under the control of the server apparatus 3. Thus, the vehicle position behavior DB 53 accumulates and holds the travel information regarding all the automobiles 2 under the control of the server apparatus 3. In addition, in the vehicle position behavior DB 53, the travel information regarding the multiple automobiles 2 may be associated with identification information issued for each automobile 2.

The control information generator 42 basically periodically generates and transmits the individual control information different between the automobiles 2, regarding each of the multiple automobiles 2, by using the information held in the vehicle position behavior DB 53.

The emergency processor 43 is implemented only when the travel information newly received by the communication device 23 includes information that hinders travel of other automobiles.

Here, the information that hinders the travel of the other automobiles and is included in the travel information may be, for example, information indicating that the automobile 2 that has transmitted the travel information is stopped on the road, or detection information of the automobile 2 corresponding to the information indicating that the automobile 2 is stopped on the road.

The emergency processor 43 basically identifies the position of the automobile 2 that has transmitted the travel information including the information that hinders the travel of the other automobiles, and records, with respect to the position, a passage regulation region for prohibition or suppression of travel of other vehicles, in the road regulation DB 52.

Thus, the road regulation DB 52 holds regulation information regarding the road 90 on which the multiple automobiles 2 travel. The road regulation DB 52 holds passage regulation information including a passage prohibition region 96 and a passage warning region 97 described later.

In addition, the road regulation DB 52 may hold, for example, traffic regulation information not included in the travel information transmitted from each automobile 2. For example, the advanced transportation system or the like generates traffic regulation information corresponding to a situation of the road 90. Such traffic regulation information or the like may also be held in the road regulation DB 52. In this manner, the road regulation DB 52 may hold quasi-dynamic information regarding the road 90 at present.

In such a traffic control system 1, basically, the server apparatus 3 is able to repeatedly generate multiple pieces of the individual control information to control the travel of the multiple automobiles 2 traveling under the control, by a control by the pre-processor 41 and the control information generator 42. In the automobile 2 that receives the individual control information, the travel control device 12 of the automobile 2 is able to generate the control value following a request in the individual control information, by using the individual control information received from the server apparatus 3, and control the travel of the subject vehicle by the automated driving. The multiple automobiles 2 execute the travel control basically following the control of the server apparatus 3, under the control of the server apparatus 3. This makes it possible for the multiple automobiles 2 to safely travel without causing interference with each other.

For example, as indicated by the solid lines in FIG. 4, in step ST1, the travel control device 12 of the automobile 2 acquires vehicle information regarding the subject vehicle. In step ST2, the travel control device 12 transmits the vehicle information to the server apparatus 3 as the travel information regarding the subject vehicle. In addition, in step ST4, the travel control device 12 generates the control value for the travel control by using the vehicle information regarding the subject vehicle acquired in step ST1. In step ST5, the travel control device 12 executes the travel control of the subject vehicle. The travel control device 12 of the automobile 2 periodically executes such an autonomous travel control, as illustrated in FIG. 4 in which steps ST1 to ST5 are repeated. Thus, it is possible for the travel control device 12 to check the latest travel state and keep on controlling the travel of the subject vehicle to cope with the travel state at each timing.

In the server apparatus 3, upon receiving and acquiring new travel information from each automobile 2 in step ST11, in step ST14, the pre-processor 41 calculates a position on the lane (hereinafter referred to as a vehicle S-position) of the automobile 2. In addition, the pre-processor 41 reads the high-precision map data 51. In step ST17, the pre-processor 41 generates a vehicle behavior plan for the automobile 2 in accordance with, for example, a shape of the road 90. In step ST18, the pre-processor 41 records the vehicle behavior plan generated, in the vehicle position behavior DB 53. The pre-processor 41 repeats the processes in steps ST11 to ST18 every time new travel information is received from each automobile 2. Thus, the vehicle position behavior DB 53 holds the vehicle behavior plan corresponding to the latest travel state of each of the multiple automobiles 2. Here, the vehicle behavior plan may include information such as acceleration, speed keeping, deceleration, a stop, the speed range (the upper limit and the lower limit), lane keeping, or a lane change of each automobile 2.

In the server apparatus 3, in step ST21, the control information generator 42 periodically reads information from the vehicle position behavior DB 53. In step ST23, the control information generator 42 determines interference of each automobile 2. In step ST24, the control information generator 42 generates the individual control information corresponding to the interference. In step ST25, the control information generator 42 transmits the individual control information to each automobile 2. In this case, the travel control device 12 of the automobile 2 is able to control the travel of the subject vehicle by generating the control value to basically follow the individual control information, by using the latest individual control information acquired from the server apparatus 3 together with the vehicle information regarding the subject vehicle acquired in step ST1.

Note that, even after the automobile 2 controls the travel of the subject vehicle basically following the individual control information, there is possibility that the travel state of the automobile 2 is short of favorable suppression of, for example, the interference. In such a case, the server apparatus 3 generates and transmits the next piece of the individual control information including a similar request to the previous one. By repeating the travel control following the individual control information including the similar request, the travel of the automobile 2 is expected to approach the travel state following a determination result as to the interference or the like in the server apparatus 3, and enter the relevant travel state.

In addition, in the traffic control system 1, the server apparatus 3 includes the emergency processor 43, separately from the pre-processor 41 and the control information generator 42 constantly implemented for the traffic control described above. The emergency processor 43 is implemented only upon occurrence of an event that hinders the travel of the other automobiles. A control involving the emergency processor 43 is described in detail below. Here, a case where the automobile 2 malfunctions to park or stop or is involved in an accident on the road is described as an example of the event that hinders the travel of the other automobiles.

FIG. 5 is a flowchart of a pre-processing control by the server CPU 34 in FIG. 2.

The server CPU 34 repeatedly executes the pre-processing control in FIG. 5 as the processing by the pre-processor 41.

In step ST10, the pre-processor 41 determines whether new travel information has been received and acquired by the server communication device 31. When no new travel information has been acquired, the pre-processor 41 repeats this process. Upon acquiring new travel information, the pre-processor 41 causes the flow to proceed to step ST11.

In step ST11, the pre-processor 41 determines whether, in the new travel information, the automobile 2 that has transmitted the travel information is parked or stopped on the road. For example, when the travel information includes information regarding the position on the lane, as the position of the automobile 2, and information indicating a vehicle speed of 0, the pre-processor 41 may determine that the automobile 2 that has transmitted the new travel information is parked or stopped on the road. In this case, the pre-processor 41 assumes that travel hindrance has occurred on the road, and causes the flow to proceed to step ST12. When the automobile 2 that has transmitted the new travel information is not parked or stopped on the road, the pre-processor 41 assumes that no travel hindrance has occurred on the road, and causes the flow to proceed to step ST19.

In step ST19, the pre-processor 41 determines whether, in the new travel information, the automobile 2 that has transmitted the travel information is involved in an accident on the road. For example, when the travel information includes information regarding the position on the lane, as the position of the automobile 2, and information indicating activation of an airbag of the automobile 2, the pre-processor 41 may determine that automobile 2 that has transmitted the new travel information is involved in an accident on the road. In this case, the pre-processor 41 causes the flow to proceed to step ST12. By the determination in step ST11 and step ST19, the pre-processor 41 determines whether travel hindrance has occurred on the road, and causes the flow to proceed to step ST12 when travel hindrance has occurred. In contrast, when the pre-processor 41 does not determine that the automobile 2 is involved in an accident on the road, the pre-processor 41 assumes that no travel hindrance has occurred on the road, and causes the flow to proceed to step ST13.

In step ST12, the pre-processor 41 causes an interruption in the server apparatus 3. In this manner, the pre-processor 41 causes the interruption when the travel information newly received by the server communication device 31 includes information that hinders travel of other automobiles. Thereafter, the pre-processor 41 causes the flow to proceed to step ST13.

From step ST13, the pre-processor 41 starts generating information to be recorded in the vehicle position behavior DB 53, for the automobile 2 related to the newly received travel information. The pre-processor 41 first reads the high-precision map data 51.

In step ST14, the pre-processor 41 calculates the vehicle S-position, based on positional information regarding the automobile 2 included in the newly received traveling information and the high-precision map data 51. The vehicle S-position indicates the lane on which the automobile 2 related to the travel information is traveling, and the position on the lane.

In step ST15, the pre-processor 41 updates reliability of the newly received travel information. For example, when travel information is periodically received at intervals equal to or less than a predetermined threshold time, from the automobile 2 from which the travel information has been received, the pre-processor 41 updates the reliability to high reliability. In contrast, when travel information is received, for example, intermittently and not periodically, the pre-processor 41 updates the reliability to a lower one. In this case, the reliability decreases stepwise as a state where travel information is received intermittently continues.

In step ST16, the pre-processor 41 reads the road regulation DB 52.

In step ST17, the pre-processor 41 generates the vehicle behavior plan for the automobile 2 from which the new travel information has been received, by using the information acquired in the processes by step ST16.

The pre-processor 41 generates the vehicle behavior plan indicating a travel schedule of the automobile 2, basically based on, for example, the vehicle S-position and a route of the automobile 2 from which the new travel information has been received.

Note that, for example, when the road regulation DB 52 includes regulation on the road 90 that has influence on the travel schedule of the automobile 2 from which the new travel information has been received, the pre-processor 41 generates the vehicle behavior plan that allows for travel to cope with the regulation on the road 90 as well.

The vehicle behavior plan generated by these processes may include, for example, information regarding acceleration of the automobile 2, information regarding speed keeping, information regarding deceleration, information regarding a stop, information regarding the speed range (the upper limit and the lower limit), information regarding lane keeping, information regarding a lane change, and the like.

In step ST18, the pre-processor 41 records the information generated in the processes by step ST17, in the vehicle position behavior DB 53, and updates the vehicle position behavior DB 53. Thereafter, the pre-processor 41 ends this control.

FIG. 6 is a flowchart of an emergency processing control by the server CPU 34 in FIG. 2.

The server CPU 34 executes the emergency processing control in FIG. 6, as the processing by the emergency processor 43.

In step ST31, the emergency processor 43 determines whether an interruption has occurred in the server apparatus 3. The pre-processor 41 causes the interruption in step ST12 of FIG. 5, only when the travel information newly received by the server communication device 31 includes the information that hinders the travel of the other automobiles. In this case, the emergency processor 43 determines that an interruption has occurred in the server apparatus 3, and causes the flow to proceed to step ST32. In contrast, when no interruption has occurred in the server apparatus 3, the emergency processor 43 repeats this process.

In this manner, by the interruption being caused by the pre-processor 41, the emergency processor 43 is implemented earlier, preferentially over the control information generator 42 that periodically generates the individual control information.

In step ST32, the emergency processor 43 identifies a parking or stopping position, on the road, of the automobile 2 assumed to hinder the travel of the other automobiles. The emergency processor 43 may calculate the vehicle S-position as the parking or stopping position on the road. Thereafter, the emergency processor 43 causes the flow to proceed to step ST38.

In step ST38, the emergency processor 43 determines whether the situation hindering the travel of the other automobiles is due to an accident. This determination may be basically similar to that in step ST19. When the travel hindrance is due to an accident, the emergency processor 43 causes the flow to proceed to step ST39. When the travel hindrance is not due to an accident, the emergency processor 43 causes the flow to proceed to step ST33.

From step ST33, the emergency processor 43 starts generating the passage regulation region. The emergency processor 43 first generates the passage prohibition region 96 that prohibits travel of other vehicles, for the lane on which the automobile 2 assumed to hinder the travel of the other automobiles is parked or stopped. Here, the passage prohibition region 96 may be, for example, a range with a predetermined length in a direction opposite to the travel direction of the lane, from the vehicle S-position calculated in step ST32. The length of the passage prohibition region 96 may be set to a length that allows the other automobiles to stop before the vehicle S-position, based on, for example, information regarding a speed limit of the lane or the road 90.

In step ST34, the emergency processor 43 generates the passage warning region 97 that suppresses travel of other vehicles, for a remaining lane different from the lane on which the automobile 2 assumed to hinder the travel of the other automobiles is parked or stopped. Here, the remaining lane may be a lane that allows for travel in the same direction as the lane for which the passage prohibition region 96 is set, or an oncoming lane that allows for travel in a direction opposite thereto. When the road 90 including the lane for which the passage prohibition region 96 is set has three or more lanes, the emergency processor 43 may generate the passage warning region 97 for some of them, or generate the passage warning region 97 for all of them, in accordance with, for example, the shape of the road 90 such as a median strip. In addition, the passage warning region 97 may be, for example, a range with a predetermined length in a direction opposite to the travel direction of the lane, from the vehicle S-position calculated in step ST32 The length of the passage warning region 97 may be set to a length that allows the other automobiles to sufficiently decelerate before the vehicle S-position, based on, for example, the information regarding the speed limit of the lane or the road 90. Thereafter, the emergency processor 43 causes the flow to proceed to step ST35.

In contrast, in step ST39, the emergency processor 43 generates the passage prohibition region 96 that prohibits travel of other vehicles, for not only the lane on which the automobile 2 involved in the accident serves as the travel hindrance, but also basically all the lanes of the road. Here, the passage prohibition region 96 may be, for example, a range with a predetermined length in a direction opposite to the travel direction of the lane, from the vehicle S-position calculated in step ST32. The length of the passage prohibition region 96 may be set to a length that allows the other automobiles to stop before the vehicle S-position, based on, for example, information regarding a speed limit of the lane or the road 90. Thereafter, the emergency processor 43 causes the flow to proceed to step ST35.

In step ST35, the emergency processor 43 records the information generated by step ST34 in the road regulation DB 52, to update the road regulation DB 52.

Thus, the road regulation DB 52 holds, for example, the passage regulation information including the passage prohibition region 96 and the passage warning region 97 for each lane, as for the road 90 around the position of the automobile 2 parked or stopped on the road.

From step ST40, the emergency processor 43 starts processing of generating and transmitting the individual control information to be transmitted to each automobile 2 susceptible to influence of the travel hindrance. The emergency processor 43 first selects all the automobiles 2 susceptible to the influence of the travel hindrance, from among all the automobiles 2 under the control. The emergency processor 43 may read, for example, the road regulation DB 52, and select all the automobiles 2 assumed to travel in the passage prohibition region 96 or the passage warning region 97 if they keep the current travel. The emergency processor 43 may simply select all the automobiles 2 within a predetermined radius centered around the vehicle S-position of the automobile 2 serving as the travel hindrance.

In step ST41, the emergency processor 43 generates the individual control information to be used to cope with the travel hindrance regarding each of the automobiles 2 selected in step ST40. The individual control information in this case includes a request for deceleration or a stop, to reduce the speed as compared with, for example, if there is no travel hindrance. The emergency processor 43 may generate the individual control information by executing, for example, the process in step ST51 of FIG. 5 and step ST52 of FIG. 4.

In step ST42, the emergency processor 43 transmits the individual control information generated in step ST41 to each automobile 2. Thus, immediately when the server apparatus 3 receives the travel information from the automobile 2 parked or stopped, for example, on the road, it is possible for each automobile 2 to receive the individual control information corresponding to the travel information from the server apparatus 3.

Thereafter, the emergency processor 43 ends this control.

As described above, the emergency processor 43 is implemented based on the interruption by the pre-processor 41, only when the travel information newly received by the server communication device 31 includes the information that hinders the travel of the other automobiles. It is possible for the emergency processor 43 to generate and transmit information corresponding to the information that hinders the travel of the other automobiles, as the individual control information regarding each of the multiple automobiles 2, by using the information held in the server DB 5.

After such a control by the emergency processor 43, the pre-processor 41 reads the road regulation DB 52 in step ST16 of FIG. 5.

When the road regulation DB 52 holds the passage prohibition region 96, in step ST17, the pre-processor 41 generates the vehicle behavior plan including a request for a stop, for example, for the automobile 2 assumed to travel in a section of the passage prohibition region 96. In step ST18, the pre-processor 41 records the vehicle behavior plan in the vehicle position behavior DB 53.

When the road regulation DB 52 holds the passage warning region 97, in step ST17, the pre-processor 41 generates the vehicle behavior plan including a request for deceleration, for example, for the automobile 2 assumed to travel in a section of the passage warning region 97. In step ST18, the pre-processor 41 records the vehicle behavior plan in the vehicle position behavior DB 53.

FIG. 7 is a flowchart of a control information generation control by the server CPU 34 in FIG. 2.

The server CPU 34 periodically executes the control information generation control in FIG. 7, as the processing by the control information generator 42. Thus, the server CPU 34 continues to periodically transmit the individual control information to the multiple automobiles 2 under the control.

When the interruption has been caused in the processing by the pre-processor 41 in FIG. 5, the server CPU 34 executes the control information generation control in FIG. 7 after executing the emergency processing control in FIG. 6.

In step ST21, the control information generator 42 reads the vehicle position behavior DB 53.

When the automobile 2 parked or stopped on a lane to hinder travel of other automobiles is present, the passage prohibition region 96 and the passage warning region 97 are set around the parked or stopped automobile 2, in the vehicle position behavior DB 53.

In step ST22, the control information generator 42 selects one unprocessed automobile 2 from among the multiple automobiles 2 regarding which the information is held in the vehicle position behavior DB 53.

In step ST23, the control information generator 42 determines presence or absence of the interference of the automobile 2 selected in step ST22 with other automobiles, by using the information held in the vehicle position behavior DB 53.

Here, the interference may include not only that the position of the selected automobile 2 overlaps a position of another automobile, but also that an inter-vehicle distance becomes equal to or smaller than a threshold. For example, as for a subsequent automobile moving at a higher speed than a preceding automobile, there is possibility that the inter-vehicle distance from the subsequent automobile to the preceding automobile becomes equal to or smaller than the threshold depending on a speed difference. The control information generator 42 may determine the presence or absence of such interference regarding, for example, the inter-vehicle distance, by using a threshold or the like.

In step ST24, the control information generator 42 generates the individual control information, regarding the automobile 2 selected in step ST22.

For example, when it is determined that the interference with the preceding automobile is present as described above, the control information generator 42 may generate the individual control information including a request for speed keeping or deceleration, even if the vehicle position behavior DB 53 bolds information regarding, for example, acceleration or speed keeping.

In contrast, when it is determined that there is no interference with other automobiles, the control information generator 42 may use the information held in the vehicle position behavior DB 53 as it is, to generate the individual control information.

When the road regulation DB 52 holds the passage prohibition region 96, the pre-processor 41 generates the individual control information including a request for a stop, for example, for the automobile 2 assumed to travel in the section of the passage prohibition region 96.

When the road regulation DB 52 holds the passage warning region 97, the pre-processor 41 generates the individual control information including a request for deceleration, for example, for the automobile 2 assumed to travel in the section of the passage warning region 97.

In this manner, the control information generator 42 generates, as the individual control information, information including a request for acceleration, speed keeping, deceleration, a stop, the speed range (the upper limit and the lower limit), lane keeping, or a lane change of each automobile 2, instead of the control value to be used for the travel control by each automobile 2.

In addition, for each automobile 2 susceptible to the influence of the travel hindrance, the control information generator 42 generates the individual control information including a request for deceleration or a stop, to reduce the speed as compared with, for example, if there is no travel hindrance.

In step ST25, the control information generator 42 transmits the individual control information generated in step ST24, from the server communication device 31 to the corresponding automobile 2.

In step ST26, the control information generator 42 determines whether selection has been finished for all the automobiles 2 regarding which the information is held in the vehicle position behavior DB 53. When the selection of all the automobiles 2 has not been finished, the control information generator 42 causes the flow to return to step ST22. In this case, the control information generator 42 repeats the processes from step ST22 to step ST26, and generates and transmits the individual control information regarding the new automobile 2. When the selection of all the automobiles 2 is finished, the control information generator 42 ends this control.

As described above, when the road regulation DB 52 holds the passage regulation region, the control information generator 42 generates and transmits the individual control information for deceleration or a stop, for the automobile 2 that is likely to travel in the passage regulation region. For the automobile 2 that intends to travel in the passage regulation region held in the road regulation DB 52, the control information generator 42 generates and transmits the individual control information for a reduction in the speed as compared with the automobile 2 that is likely to travel in a region regarding which such information is not held.

FIG. 8 is a flowchart of the travel control under the traffic control, by the travel control device 12 in FIG. 3.

The travel control device 12 of each of the multiple automobiles 2 traveling under the control of the server apparatus 3 repeatedly executes the travel control under the traffic control in FIG. 8.

When the travel control device 12 is executing the travel control under the control of the server apparatus 3, the communication device 23 of the relevant automobile 2 normally periodically receives the individual control information from the server apparatus 3. The outside communication control device outputs the individual control information received by the communication device 23 to the travel control device 12 through the vehicle network 17. The travel control device 12 may accumulate and record the individual control information in the memory.

In step ST1, the travel control device 12 collects and acquires the vehicle information such as the information indicating the travel state of the subject vehicle and the information regarding the travel environment around the subject vehicle from, for example, the sensor control device 11 of the subject vehicle. Note that the information to be acquired from, for example, the sensor control device 11 of the subject vehicle may be acquired in advance and held in, for example, the memory of the travel control device 12. Here, the vehicle information may include information regarding, for example, positions, directions, speeds, acceleration rates, and travel directions of the subject vehicle and other vehicles around the subject vehicle included in, for example, the captured image by the in-vehicle camera. The travel control device 12 may process the information acquired from, for example, the sensor control device 11 to generate these pieces of information. In addition, the vehicle information may include, for example, information indicating operation states, control contents, and control results of, for example, the driving control device 13, the steering control device 14, and the braking control device 15. In addition, the vehicle information may include information regarding the time generated by the GNSS receiver 21.

In step ST2, the travel control device 12 transmits the travel information based on the vehicle information acquired in step ST1 to the server apparatus 3 by using the vehicle outside communication control device 16. The vehicle outside communication control device 16 transmits the travel information inputted from the travel control device 12, to the server apparatus 3 through the communication device 23 and the base station 7. Here, the travel information may include information to be used by the server apparatus 3 in the control thereof. The travel information may be the vehicle information as it is, or may be a portion of the vehicle information. For the traffic control, the server apparatus 3 necessitates information regarding the position of each automobile 2 as minimum information regarding each automobile 2.

In step ST3, the travel control device 12 acquires the latest individual control information acquired from the server apparatus 3.

In step ST4, the travel control device 12 generates the control value to control the travel of the subject vehicle, based on the information acquired by step ST3.

When the individual control information addressed to the subject vehicle is received from the server apparatus 3, the travel control device 12 basically follows the received individual control information addressed to the subject vehicle, and generates the control value for the travel control of the subject vehicle, to correspond to the vehicle information as well.

In contrast, when the individual control information addressed to the subject vehicle is not received from the server apparatus 3, the travel control device 12 generates the control value for the travel control of the subject vehicle, to correspond to the vehicle information.

Thus, the travel control device 12 generates, for example, the control value that causes acceleration of the automobile 2, the control value that causes speed keeping, the control value that causes deceleration, the control value that causes a stop, the control value that causes speed keeping in the speed range (the upper limit and the lower limit), the control value that causes steering for Jane keeping, and the control value that causes steering for a lane change.

In step ST5, the travel control device 12 outputs the control value generated in step ST4 to each of the control devices that execute the travel control of the subject vehicle through the vehicle network 17. Thus, for example, the driving control device 13 executes a control to bring a driving output to the control value. The steering control device 14 executes a control to bring the steering angle including a steering direction to the control value. The braking control device 15 executes a control to bring a braking force to the control value.

Thereafter, the travel control device 12 ends this control.

FIG. 9 is an explanatory diagram of a travel environment in which the automobile 2 traveling on the two-lane the road 90 has malfunctioned and stopped on the road.

FIG. 10 is an explanatory diagram of a travel environment in which the passage prohibition region 96 and the passage warning region 97 are set after the stop on the road in FIG. 9.

FIGS. 9 and 10 illustrate the road 90 including the first lane 91 and the second lane 92 on which the automobiles 2 are able to travel in the same direction. In addition, the first line segment S1 in the high-precision map data 51 is illustrated to overlap with the middle of the first lane 91. The second line segment S2 in the high-precision map data 51 is illustrated to overlap with the middle of the second lane 92.

When the server apparatus 3 performs the remote control based on the individual control information, each automobile is basically subjected to the remote control to travel along the first line segment S1 or the second line segment S2. Note that the server apparatus 3 may generate the individual control information considering, for example, a driver characteristic. In this case, the course of each automobile based on the individual control information allows each automobile to travel along a route shifted within the lane from the first line segment S1 or the second line segment S2 at substantially constant intervals in a vehicle width direction.

As illustrated in FIG. 9, a second automobile 62 is traveling behind a first automobile 61 on the first lane 91. A fourth automobile 64 is traveling behind a third automobile 63 on the second lane 92. The third automobile 63 is traveling substantially side-by-side with the first automobile 61.

The first automobile 61, the second automobile 62, the third automobile 63, and the fourth automobile 64 are traveling under the control of the server apparatus 3. The control information generator 42 of the server apparatus 3 repeatedly generate and transmit, for example, the individual control information that requests each of the first automobile 61, the second automobile 62, the third automobile 63, and the fourth automobile 64 to keep the current travel of each automobile. In this case, the first automobile 61, the second automobile 62, the third automobile 63, and the fourth automobile 64 basically control the travel of each automobile to keep the state illustrated in FIG. 9.

Under such a travel environment, for example, when the first automobile 61 malfunctions, the first automobile 61 basically decelerates and stops on the first lane 91 on which the first automobile 61 is traveling. The first automobile 61 parks or stops on the first lane 91. i.e., on the road. The first automobile 61 parked or stopped on the road transmits the travel information indicating that the subject vehicle is parked or stopped on the first lane 91. i.e., on the road, to the server apparatus 3, in step ST2 of FIG. 8.

Upon acquiring the travel information from the first automobile 61 parked or stopped on the road, the preprocessor 41 of the server apparatus 3 determines that the first automobile 61 is parked or stopped on the road in step ST11 of FIG. 5, and causes an interruption in step ST12. The emergency processor 43 of the server apparatus 3 determines that the interruption has been caused in step ST31 of FIG. 6, and starts processing with priority over the control information generator 42.

The emergency processor 43 first sets the passage regulation region including the passage prohibition region 96 and the passage warning region 97 for the road 90 on which the first automobile 61 is parked or stopped. In FIG. 10, the passage prohibition region 96 is set for the first lane 91 on which the first automobile 61 is parked or stopped, and the passage warning region 97 is set for the second lane 92 adjacent to the first lane 91.

Furthermore, the emergency processor 43 determines, for example, interference between each of the second to fourth automobiles 62 to 64 and the passage prohibition region 96 and the passage warning region 97, and generates and transmits the individual control information following the determination, in step ST41 of FIG. 6. As illustrated in FIG. 10, the emergency processor 43 of the server apparatus 3 may generate the individual control information that requests, for example, the second automobile 62 to stop in the passage prohibition region 96. The emergency processor 43 may generate the individual control information that requests, for example, the third automobile 63 to keep the current speed and escape from the passage warning region 97. The emergency processor 43 may generate the individual control information that requests, for example, the fourth automobile 64 to pass through the passage warning region 97 while decelerating to a speed that allows for an immediate stop.

As a result, as illustrated in FIG. 10, the second automobile 62 stops in the passage prohibition region 96. The third automobile 63 escapes from the passage warning region 97. The fourth automobile 64 travels at a low speed that allows for an immediate stop and passes through the passage warning region 97.

FIG. 11 is an explanatory diagram of a travel environment in which the automobile 2 traveling on the two-lane road 90 has caused a single accident and stopped on the road.

FIG. 12 is an explanatory diagram of a travel environment in which the passage prohibition region is set for all the lanes 91 and 92 of the road 90 after the single accident in FIG. 11.

As illustrated in FIG. 11, the second automobile 62 is traveling behind the first automobile 61 on the first lane 91. The fourth automobile 64 is traveling behind the third automobile 63 on the second lane 92.

The first automobile 61, the second automobile 62, the third automobile 63, and the fourth automobile 64 are traveling under the control of the server apparatus 3. The control information generator 42 of the server apparatus 3 repeatedly generate and transmit, for example, the individual control information that requests each of the first automobile 61, the second automobile 62, the third automobile 63, and the fourth automobile 64 to keep the current travel of each automobile. In this case, the first automobile 61, the second automobile 62, the third automobile 63, and the fourth automobile 64 basically control the travel of each automobile to keep the state illustrated in FIG. 9.

Under such a travel environment, for example, when the first automobile 61 is involved in a single accident on the first lane 91, the first automobile 61 basically decelerates and stops on the first lane 91 on which the first automobile 61 is traveling. The first automobile 61 stops on the first lane 91, i.e., on the road. The first automobile 61 stopped on the road transmits the travel information indicating that the subject vehicle is stopped due to the accident on the first lane 91, i.e., on the road, to the server apparatus 3, in step ST2 of FIG. 8.

Upon acquiring the travel information from the first automobile 61 stopped on the road due to the accident, the pre-processor 41 of the server apparatus 3 determines that the first automobile 61 is stopped due to an accident on the road in step ST19 of FIG. 5, and causes an interruption in step ST12. The emergency processor 43 of the server apparatus 3 determines that the interruption has been caused in step ST31 of FIG. 6, and starts the processing with priority over the control information generator 42.

The emergency processor 43 first sets the passage regulation region including the passage prohibition region 96, for all the lanes 91 and 92 of the road 90 on which the first automobile 61 is stopped due to the accident. In FIG. 12, the passage prohibition region 96 is set for the first lane 91 on which the first automobile 61 is stopped due to the accident, and the second Jane 92 adjacent to the first lane 91.

Furthermore, the emergency processor 43 determines, for example, interference between each of the second to fourth automobiles 62 to 64 and the passage prohibition region 96, and generates and transmits the individual control information following the determination, in step ST41 of FIG. 6. For example, the emergency processor 43 may determine that each of the second to fourth automobiles 62 to 64 and the passage prohibition region 96 interfere with each other, and generate and transmit the individual control information that causes a stop of each automobile. As illustrated in FIG. 12, the emergency processor 43 of the server apparatus 3 may generate the individual control information that requests, for example, the second automobile 62 to stop in the passage prohibition region 96 of the first lane 91. The emergency processor 43 may generate the individual control information that requests, for example, the third automobile 63 to stop in the passage prohibition region 96 of the second lane 92. The emergency processor 43 may generate the individual control information that requests, for example, the fourth automobile 64 to stop in the passage prohibition region 96 of the second lane 92.

As a result, as illustrated in FIG. 12, the second automobile 62, the third automobile 63, and the fourth automobile 64 stop in the passage prohibition region 96 before a site of the accident.

As described above, the present embodiment uses the server apparatus 3 to control the travel of the multiple automobiles 2. Each of the multiple automobiles 2 includes the travel control device 12 that generates the control value to control the travel of the automobile 2 as the subject vehicle.

In addition, the server apparatus 3 generates the individual control information regarding each of the multiple automobiles 2 based on the travel information regarding the multiple automobiles 2, and transmits the individual control information to the multiple automobiles 2. Specifically, for example, the server apparatus 3 generates, as the individual control information different between the automobiles 2 regarding each of the multiple automobiles 2, information (the individual control information) including a request for acceleration, deceleration, a stop, lane keeping, or a lane change of each automobile 2, instead of the control value to be used for the travel control by each automobile 2. When the travel control device 12 of each of the multiple automobiles 2 receives the individual control information addressed to the subject vehicle from the server apparatus 3, the travel control device 12 of each of the multiple automobiles 2 generates the control value for the travel control of the subject vehicle by using the received individual control information addressed to the subject vehicle. In this manner, by utilizing the travel control device 12 provided in the multiple automobiles 2, it is possible for the server apparatus 3 to perform the traffic control on the travel of the multiple automobiles 2, without generating the individual control value different between the automobiles 2 regarding the multiple automobiles 2. Even if the control range of the server apparatus 3 widens or the number of the automobiles 2 to be controlled increases, it is possible for the server apparatus 3 to perform the traffic control on the travel of the multiple automobiles 2 with a lower processing load, as compared with a case of generating the individual control value for each automobile 2.

Moreover, the server apparatus 3 in the present embodiment includes the server DB 5 that accumulates and holds the travel information regarding each of the multiple automobiles 2. The pre-processor 41 of the server apparatus 3 records, when the server communication device 31 receives new travel information, the information regarding at least the travel position of the automobile 2 from which the travel information has been received in the server DB 5. In addition, the control information generator 42 of the server apparatus 3 periodically generates the individual control information different between the automobiles 2 regarding each of the multiple automobiles 2, by using the information held in the server DB 5. In contrast, the emergency processor 43 of the server apparatus 3 is implemented only when the travel information newly received by the server communication device 31 includes information that hinders travel of other automobiles. Accordingly, when no situation that hinders the travel of the automobiles 2 has occurred, only the pre-processor 41 and the control information generator 42 are implemented in the server apparatus 3. Periodic processing in a normal operation of the server apparatus 3 increases or decreases in accordance with the number of the automobiles 2 to be controlled. A processing capability of the server apparatus 3 is easily determinable based on the number of the automobiles 2 assumed in its control range. In addition, it is expected to be possible for the server apparatus 3 to stably keep generating, without failure, the individual control information different between the automobiles 2 regarding each of the multiple automobiles 2.

Upon occurrence of the situation that hinders the travel of the automobiles 2, the server apparatus 3 in the present embodiment implements the emergency processor 43 based on the travel information newly received by the server communication device 31. The emergency processor 43 generates and transmits the information corresponding to the information that hinders the travel of the other automobiles, as the individual control information regarding each of the multiple automobiles 2, by using the information held in the server DB 5. The individual control information generated by the emergency processor 43 is transmitted to each automobile 2, as with the individual control information periodically generated by the control information generator 42. Thus, it is possible for the travel control device 12 of each automobile 2 to receive the latest individual control information generated by the emergency processor 43 implemented upon occurrence of the situation that hinders the travel of the automobiles 2, without waiting for reception of the individual control information generated by the control information generator 42. Moreover, the individual control information corresponds to the information that hinders the travel of the other automobiles. As a result, upon occurrence of a situation that hinders the travel of the subject vehicle, it is possible for the travel control device 12 of each automobile 2 to immediately receive the individual control information to be used to cope with the situation, and control the travel of the subject vehicle to correspond to the individual control information, without waiting for reception of the individual control information generated by the control information generator 42. For example, as indicated by a dashed-line arrow in FIG. 4, in the process of executing the travel control (step ST5) immediately after occurrence of a situation in which another automobile hinders the travel of the subject vehicle, it is possible for the travel control device 12 of each automobile 2 to immediately start the travel control for coping with the hindrance situation.

In addition, even in a case of immediately coping with such a situation that binders the travel of the automobiles 2, the server apparatus 3 does not have to generate the individual control value for each automobile 2. Processing contents of and the processing load on the server apparatus 3 upon occurrence of the situation that hinders the travel of the automobiles 2 tend not to be excessive as compared with in the normal operation with no situation that hinders the travel of the automobiles 2.

As described above, the present embodiment makes it possible to achieve a travel control for automated driving of the automobile 2, to reduce the processing loads on the automobile 2 and the server apparatus 3 used together with the automobile 2, and to make it possible to cope with immediacy with a situation that hinders the travel of the automobiles 2 if any.

Second Embodiment

Next, the vehicle traffic control system 1 according to a second embodiment of the invention is described.

In the following, features similar to those in the above-described embodiment are denoted by the same reference numerals and description thereof is omitted. The following description is given mainly of differences from the above-described embodiment.

The present embodiment describes an example of coping with, as an event that hinders travel of other automobiles, a case where the occupant alights from the automobile 2 parked or stopped on the road, in addition to a case where the automobile 2 is parked or stopped on the road.

In this case, in step ST11 of FIG. 5, the pre-processor 41 of the server apparatus 3 determines that travel hindrance has occurred on the road and causes the flow to proceed to step ST12, not only when the automobile 2 is parked or stopped on the road, but also when the occupant alights from the automobile 2 parked or stopped on the road. The pre-processor 41 causes an interruption in step ST12 also when the occupant alights from the automobile 2 parked or stopped on the road.

FIG. 13 is a flowchart of an emergency processing control to be executed by the server CPU in the vehicle traffic control system according to the second embodiment of the invention.

The server CPU 34 executes the emergency processing control in FIG. 13, as the processing by the emergency processor 43.

Steps ST31 to ST35 of FIG. 13 are similar to those in FIG. 6. Note that, when the emergency processor 43 determines that it is not an accident in step ST38, the emergency processor 43 causes the flow to proceed to step ST36.

In step ST36, the emergency processor 43 determines a cause of the interruption.

The present embodiment assumes, as the event that hinders the travel of the other automobiles, also a case where the occupant alights from the automobile 2 parked or stopped on the road.

Thus, the emergency processor 43 may determine whether the cause of the interruption is alighting of the occupant from the automobile 2 parked or stopped on the road.

When the travel information received from the automobile 2 may include information regarding an opening-closing detection result of a door 65, the emergency processor 43 may determine whether the occupant has alighted from the automobile 2 parked or stopped on the road, based on the opening-closing detection result of the door 65.

When the occupant has alighted, the emergency processor 43 assumes that the cause of the interruption is alighting of the occupant, and causes the flow to proceed to step ST37.

When no occupant has alighted, the emergency processor 43 assumes that the cause of the interruption is not alighting of the occupant, and causes the flow to proceed to step ST33.

Note that the emergency processor 43 may also determine a cause of the interruption other than alighting of the occupant. For example, when the processor causes the interruption regarding three or more travel hindrances, the emergency processor 43 may determine multiple causes of the interruption to vary processes depending on the cause of the interruption.

Step ST37 is a process executed when the automobile 2 parks or stops on the road and the occupant alights from the automobile 2. In this case, for the occupant who has alighted from the automobile 2, the emergency processor 43 executes update processing to promote the passage warning region 97 already set in step ST34 to the passage prohibition region 96. Thereafter, the emergency processor 43 causes the flow to proceed to step ST35, updates information regarding the passage warning region 97 held in the road regulation DB 52 to information regarding the passage prohibition region 96, and records the information. Thereafter, the emergency processor 43 ends this control.

Thus, the passage warning region 97 set around the automobile 2 parked or stopped on the road is updated to the passage prohibition region 96, in the road regulation DB 52. The road regulation DB 52 holds the information regarding the passage prohibition region 96 for basically all the lanes. Subsequent processing by the emergency processor 43 is similar to that in the embodiment described above.

After such a control by the emergency processor 43, the pre-processor 41 reads the road regulation DB 52 in step ST16 of FIG. 5.

When the road regulation DB 52 holds the passage prohibition region 96, in step ST17, the pre-processor 41 generates the vehicle behavior plan including a request for a stop, for example, for the automobile 2 assumed to travel in the section of the passage prohibition region 96. In step ST18, the pre-processor 41 records the vehicle behavior plan in the vehicle position behavior DB 53.

In addition, by using the road regulation DB 52, the control information generator 42 generates and transmits the individual control information that requests the automobile 2 to decelerate and stop in the passage prohibition region 96, for the automobile 2 assumed to travel in the passage prohibition region 96.

FIG. 14 is an explanatory diagram of a travel environment in which an occupant 66 alights from the automobile 2 that has malfunctioned and stopped on the two-lane the road 90. FIG. 14 illustrates the travel state after FIG. 13.

FIG. 15 is an explanatory diagram of a travel environment in which the passage warning region 97 is updated to the passage prohibition region 96 after the alighting of the occupant 66 in FIG. 14.

In FIG. 14, the second automobile 62 has already stopped in the passage prohibition region 96 of the first lane 91, based on that the first automobile 61 has malfunctioned to park or stop on the road. The third automobile 63 has escaped from the passage warning region 97 of the second lane 92. The fourth automobile 64 is traveling in the passage warning region 97 of the second lane 92 at a low speed that allows for an immediate stop.

As illustrated in FIG. 14, the occupant 66 of the first automobile 61 parked or stopped on the first lane 91 has alighted from the first automobile 61 and is running on the second lane 92. The occupant 66 is running behind the third automobile 63 that has passed through the passage warning region 97 of the second lane 92.

When the occupant 66 alights, the first automobile 61 parked or stopped transmits the travel information including information indicating that the occupant 66 has alighted, to the server apparatus 3.

Upon acquiring the travel information from the first automobile 61 parked or stopped on the road, the pre-processor 41 of the server apparatus 3 determines that the occupant 66 has alighted from the first automobile 61 parked or stopped on the first lane 91 in step ST11 of FIG. 5, and causes an interruption in step ST12. The emergency processor 43 of the server apparatus 3 determines that the interruption has been caused in step ST31 of FIG. 13, and starts the processing with priority over the control information generator 42.

The emergency processor 43 first determines that the occupant 66 has alighted in step ST36, and updates the passage warning region 97 of the second lane 92 to the passage prohibition region 96 as illustrated in FIG. 15 in step ST37. The passage regulation information for the second lane 92 held in the road regulation DB 52 is updated from the passage warning region 97 to the passage prohibition region 96.

In addition, by using the road regulation DB 52, the emergency processor 43 determines interference between each of the second to fourth automobiles 62 to 64 and the passage prohibition region 96, and generates and transmits the individual control information following the determination, in step ST41 of FIG. 13. As illustrated in FIG. 15, the emergency processor 43 of the server apparatus 3 may generate the individual control information that requests, for example, the second automobile 62 to stop in the passage prohibition region 96 of the first lane 91. The emergency processor 43 may generate the individual control information that requests, for example, the fourth automobile 64 to stop in the passage prohibition region 96 of the second lane 92. In contrast, for the third automobile 63 that has already passed through the passage prohibition region 96 of the second lane 92, the control information generator 42 may later generate the individual control information that requests the third automobile 63 to keep the current travel on the second Jane 92.

As a result, as illustrated in FIG. 15, the second automobile 62 keeps being stopped in the passage prohibition region 96 of the first lane 91. The fourth automobile 64 stops in the passage prohibition region 96 of the second lane 92. The third automobile 63 that has already passed through the passage prohibition region 96 of the second lane 92 keeps the current travel on the second lane 92.

As described above, in the present embodiment, when the travel information newly received by the server communication device 31 after the passage prohibition region 96 and the passage warning region 97 are recorded in the road regulation DB 52 includes information regarding alighting of the occupant 66 from the automobile 2, the passage warning region 97 held in the road regulation DB 52 may be updated to the passage prohibition region 96. Based on the updated road regulation DB 52, it is possible for the server apparatus 3 to switch the traffic control of the multiple automobiles 2 in accordance with a new cause of travel hindrance.

As described above, in the present embodiment, when the travel information newly received by the server communication device 31 after the passage prohibition region 96 and the passage warning region 97 are recorded in the road regulation DB 52 includes information regarding alighting of the occupant 66 from the automobile 2, the passage warning region 97 held in the road regulation DB 52 may be updated to the passage prohibition region 96.

The embodiments described above are preferred examples of embodiments of the invention. However, the invention is not limited to those, and various modifications and alternations may be made without departing from the scope of the gist of the invention.

DESCRIPTION OF REFERENCE NUMERALS

1: traffic control system, 2: automobile (vehicle), 3: server apparatus, 4: server main body, 5: server DB, 6: communication system, 7: base station, 8: communication network, 10: control system, 11: sensor control device, 12: travel control device. 13: driving control device, 14: steering control device, 15: braking control device, 16: vehicle outside communication control device, 17: vehicle network, 21: GNSS receiver, 22: vehicle outside camera, 23: communication device, 31: server communication device, 32: server GNSS receiver, 33: server memory, 34: server CPU, 35: internal bus, 41: pre-processor, 42: control information generator. 43: emergency processor, 51: high-precision map data, 52: road regulation DB. 53: vehicle position behavior DB, 61: first automobile, 62: second automobile, 63: third automobile, 64: fourth automobile, 65: door, 66: occupant, 90: road, 91: first lane, 92: second lane, 96: passage prohibition region, 97: passage warning region, S1: first line segment, S2: second line segment

The invention claimed is:

1. A vehicle traffic control system comprising:

vehicles each comprising a travel controller configured to generate a control value to control travel of a corresponding one of the vehicles as a subject vehicle; and a server apparatus configured to generate individual control information for each of the vehicles based on travel information from the vehicles, and transmit the individual control information to the vehicles, wherein, the travel controller of each of the vehicles is configured to, when receiving the individual control information addressed to the subject vehicle from the server apparatus, generate the control value for a travel control of the subject vehicle using the received latest individual control information addressed to the subject vehicle, the server apparatus comprises:

a server communication device configured to receive the travel information from each of the vehicles;

a pre-processor configured to, when the server communication device receives the travel information, record, in a database, information including at least a travel position of a vehicle that has transmitted the received travel information; and a control information generator configured to periodically generate the individual control information for each of the vehicles using the information held in the database, the pre-processor is configured to:

determine that the received travel information includes information indicating that the vehicle that has transmitted the received information is a traffic hindrance, cause an interrupt in response to determining that the vehicle is the traffic hindrance, the server apparatus further comprises an emergency processor configured, in response to the interrupt caused by the pre-processor, to:

pre-empt next scheduled periodic generation by the control information generator, such that the emergency processor executes prior to that next scheduled periodic generation;

select one or more vehicles susceptible to an influence of the traffic hindrance; and generate and transmit, to the selected one or more vehicles, per-vehicle individual control information corresponding to the traffic hindrance, using information held in the database.

2. The vehicle traffic control system according to claim 1, wherein the emergency processor is configured to;

identify a position of the vehicle that has transmitted the received travel information, and record a passage regulation region for prohibition or suppression of the travel of another vehicle in the database, before generating the per-vehicle individual control information for each of the selected one or more vehicles using the information held in the database; and when the database holds the passage regulation region, generate and transmit the per-vehicle individual control information for deceleration or a stop to a vehicle that is likely to travel in the passage regulation region.

3. The vehicle traffic control system according to claim 2, wherein, the emergency processor is configured to, when the travel information received by the server communication device from a vehicle that is traveling on a road having lanes includes, as the information that hinders the travel of another vehicle, information indicating an accident involving the vehicle that has transmitted the travel information, or detection information of the vehicle corresponding to the information indicating the accident involving the vehicle, record, as the passage regulation region, a passage prohibition region that prohibits the travel of another vehicle in the database, for all the lanes of the road on which the vehicle that has transmitted the travel information is traveling, and when the travel information received by the server communication device from a vehicle that is traveling on a road having lanes includes, as the information that hinders the travel of another vehicle, information indicating that the vehicle that has transmitted the travel information is stopped on the road, or detection information of the vehicle corresponding to the information indicating that the vehicle is stopped on the road, record, as the passage regulation region, the passage prohibition region that prohibits travel of another vehicle in the database, for the lane on which the vehicle that has transmitted the travel information is traveling, and record, as the passage regulation region, a passage warning region that suppresses travel of another vehicle in the database, for the remaining lane.

4. The vehicle traffic control system according to claim 3, wherein the emergency processor is configured to, when the travel information received by the server communication device after the passage prohibition region and the passage warning region are recorded in the database includes information indicating alighting of an occupant from the vehicle, update the passage warning region held in the database to the passage prohibition region.

5. The vehicle traffic control system according to claim 4, wherein, the emergency processor and the control information generator are configured to, when the database holds the passage regulation region, generate and transmit, for the vehicle that is likely to travel in the passage regulation region, per-vehicle individual control information for a reduction in speed as compared with a vehicle that is likely to travel in a region regarding which the passage regulation region is not held in the database.

6. The vehicle traffic control system according to claim 2, wherein the information that hinders travel of another vehicle comprises at least one of: (a) accident information, (b) information that a vehicle is parked or stopped on a road due to malfunction or otherwise, or (c) information indicating that an occupant has alighted from a stopped vehicle.

* * * * *